US010396967B2

United States Patent
Lim et al.

(10) Patent No.: US 10,396,967 B2
(45) Date of Patent: Aug. 27, 2019

(54) METHOD AND APPARATUS FOR MANAGING DOWNLINK TO UPLINK INTERFERENCE IN WIRELESS COMMUNICATION SYSTEM

(71) Applicant: Samsung Electronics Co., Ltd., Suwon-si, Gyeonggi-do (KR)

(72) Inventors: Jongbu Lim, Seoul (KR); Taeyoung Kim, Seoul (KR); Hyunseok Ryu, Yongin-si (KR); Jiyun Seol, Seongnam-si (KR); Peng Xue, Suwon-si (KR); Yeohun Yun, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/721,609

(22) Filed: Sep. 29, 2017

(65) Prior Publication Data

US 2018/0091282 A1 Mar. 29, 2018

(30) Foreign Application Priority Data

Sep. 29, 2016 (KR) .......... 10-2016-0125893
Sep. 27, 2017 (KR) .......... 10-2017-0125582

(51) Int. Cl.
*H04L 5/00* (2006.01)
*H04W 72/04* (2009.01)
(Continued)

(52) U.S. Cl.
CPC ....... *H04L 5/0082* (2013.01); *H04W 72/0406* (2013.01); *H04W 72/1289* (2013.01);
(Continued)

(58) Field of Classification Search
CPC ............ H04L 5/0082; H04W 72/1289; H04W 72/0406; H04W 72/1231; H04W 24/02; H04W 72/082
(Continued)

(56) References Cited

U.S. PATENT DOCUMENTS

| | | | |
|---|---|---|---|
| 2011/0211503 A1 | 9/2011 | Che et al. | |
| 2012/0066396 A1* | 3/2012 | Kang ................. | H04L 12/1868 709/226 |

(Continued)

FOREIGN PATENT DOCUMENTS

| | | |
|---|---|---|
| KR | 20170067453 A | 6/2017 |
| WO | 2014110802 A1 | 7/2014 |

OTHER PUBLICATIONS

Foreign Communication from Related Counterpart Application; PCT Patent Application No. PCT/KR2017/010761; International Search Report dated Jan. 9, 2018; 3 pages.

*Primary Examiner* — Kwang B Yao
*Assistant Examiner* — Syed M Bokhari

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car or connected car, health care, digital education, smart retail, security and safety services. The present disclosure discloses a method capable of solving a problem of downlink-to-uplink interference (DL-to-UL interference) occurring as dynamic time division duplex (TDD) is applied in a wireless communication system.

16 Claims, 37 Drawing Sheets

(51) Int. Cl.
*H04W 72/12* (2009.01)
*H04W 24/02* (2009.01)
*H04W 72/08* (2009.01)

(52) U.S. Cl.
CPC .......... *H04W 24/02* (2013.01); *H04W 72/082* (2013.01); *H04W 72/1231* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2012/0288817 A1* | 11/2012 | Carrillo Gonzalez ... | A61C 5/00 433/24 |
| 2014/0029537 A1* | 1/2014 | Golitschek Edler von Elbwart .............. | H04W 72/042 370/329 |
| 2015/0333877 A1 | 11/2015 | Rahman et al. | |
| 2016/0183232 A1 | 6/2016 | Stirling-Gallacher et al. | |
| 2016/0249329 A1 | 8/2016 | Au et al. | |
| 2017/0163392 A1 | 6/2017 | Lim et al. | |
| 2017/0181149 A1* | 6/2017 | Ang ........................ | H04L 5/003 |
| 2018/0049064 A1* | 2/2018 | Li .......................... | H04W 28/10 |
| 2018/0159668 A1* | 6/2018 | Phuyal .................. | H04L 1/1887 |

\* cited by examiner

METHOD AND APPARATUS FOR MANAGING DOWNLINK TO UPLINK INTERFERENCE IN WIRELESS COMMUNICATION SYSTEM

CROSS-REFERENCE TO RELATED APPLICATION AND CLAIM OF PRIORITY

This application is related to and claims priority to Korean Patent Application No. 10-2016-0125893 filed on Sep. 29, 2016, and Korean Patent Application No. 10-2017-0125582 filed on Sep. 27, 2017, the contents of which are incorporated herein by reference.

TECHNICAL FIELD

The present disclosure relates to a wireless communication system, and more particularly, to a method and an apparatus capable of solving a problem of downlink-to-uplink interference (DL-to-UL interference) occurring as dynamic time division duplex (TDD) is applied in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.[1]

In accordance with recent development of long term evolution (LTE) and LTE-advanced, a method and an apparatus capable of solving a problem of downlink-to-uplink interference (DL-to-UL interference) occurring as dynamic time division duplex (TDD) is applied in a wireless communication system are required.

SUMMARY

To address the above-discussed deficiencies, it is a primary object to provide a method of air channel design and resource allocation for rapidly exchanging interference information and obtaining UL/DL configuration information so that downlink-to-uplink interference (DL-to-UL interference) management is possible in dynamic time division duplex (TDD) that may be changed on a subframe/slot basis unlike existing flexible TDD that may be changed on a frame basis, and also proposes a method and a procedure for estimating interference and obtaining UL/DL configuration information.

Another aspect of the present disclosure considers dynamic TDD that is changed on a subframe basis unlike the existing flexible TDD that may be changed on a frame basis. Even in the case of the dynamic TTD, UL grant needs to be transmitted to a terminal several subframes/slots before a subframe/slot (transmission time interval, TTI) in which data is actually transmitted. That is, a future type of subframes/slots is determined in advance. As a result, a situation in which a service requiring low latency such as URLLC may not be transmitted in a desired time occurs. The present disclosure proposes a method for solving the problem in supporting a low latency service due to the pre-allocated subframe/slot, and a system operation method.

In accordance with an aspect of the present disclosure, a method for managing DL-to-UL interference by a base station in a wireless communication system includes: receiving allocation of first identifier information for decoding downlink control information of an adjacent base station from the adjacent base station; receiving the downlink control information of the adjacent base station and obtaining first time division duplexing (TDD) configuration information of the adjacent base station from the downlink control information using the first identifier information; measuring interference intensity of the adjacent base station; and scheduling the DL-to-UL interference based on the first TDD configuration information and the interference intensity.

The method may further include: allocating second identifier information for decoding downlink control information of the base station to the adjacent base station; and transmitting downlink control information of the base station including second TDD configuration information of the base station to the adjacent base station.

The downlink control information may be transmitted from the adjacent base station in an n-th subframe, n being a natural number, and the first TDD configuration information may be for at least one of subframes subsequent to an n+k-th subframe, k being a natural number.

The downlink control information may be transmitted from the adjacent base station at an n-th transmission time interval (TTI), n being a natural number, and the first TDD configuration information may be for at least one of TTIs subsequent to an n+k-th TTI, k being a natural number.

The interference intensity of the adjacent base station may be measured by using at least one of a measurement reference signal (MRS), a channel state information reference signal (CSI-RS), a cell-specific reference signal (CRS), a demodulation reference signal (DMRS), and tracking reference signal (TRS).

The first TDD configuration information may be uplink and downlink allocation information of the adjacent base station in which dynamic TDD is applied, and the second TDD configuration information may be uplink and downlink allocation information of the base station in which the dynamic TDD is applied.

The first TDD configuration information and the second TDD configuration information may each be transmitted through at least one of a physical downlink channel (PDCCH), a physical downlink shared channel (PDSCH), and a dedicated channel for transmitting the TDD configuration information.

The downlink control information may include information of a service type for at least one of subframes subsequent to an n+k-th subframe, or information of a service type for at least one of TTIs subsequent to an n+k-th TTI.

The method may further include removing, by the base station, self interference.

The method may further include requesting scheduling in consideration of interference to the adjacent base station.

The method may further include exchanging interference information of each beam pair with the adjacent base station.

In accordance with another aspect of the present disclosure, a base station managing DL-to-UL interference in a wireless communication system, the base station includes: a transceiver configured to transmit and receive a signal; and a controller configured to be connected to the transceiver, receive allocation of first identifier information for decoding downlink control information of an adjacent base station from the adjacent base station, receive the downlink control information of the adjacent base station, obtain first TDD configuration information of the adjacent base station from the downlink control information using the first identifier information, measure interference intensity of the adjacent base station, and schedule the DL-to-UL interference based on the first TDD configuration information and the interference intensity.

The controller may allocate second identifier information for decoding downlink control information of the base station to the adjacent base station and transmit downlink control information of the base station including second TDD configuration information of the base station to the adjacent base station.

The downlink control information may be transmitted from the adjacent base station in an n-th subframe, n being a natural number, and the first TDD configuration information may be for at least one of subframes subsequent to an n+k-th subframe, k being a natural number.

The downlink control information may be transmitted from the adjacent base station at an n-th TTI, n being a natural number, and the first TDD configuration information may be for at least one of TTIs subsequent to an n+k-th TTI, k being a natural number.

The interference intensity of the adjacent base station may be measured by using at least one of a TRS, a MRS, a CSI-RS, a CRS, a DMRS, and TRS.

The first TDD configuration information may be uplink and downlink allocation information of the adjacent base station in which dynamic TDD is applied, and the second TDD configuration information may be uplink and downlink allocation information of the base station in which the dynamic TDD is applied.

The first TDD configuration information and the second TDD configuration information may each be transmitted through at least one of a PDCCH, a PDSCH, and a dedicated channel for transmitting the TDD configuration information.

The downlink control information may include information of a service type for at least one of subframes subsequent to an n+k-th subframe, or information of a service type for at least one of TTIs subsequent to an n+k-th TTI.

The controller may perform a control to remove self interference.

The controller may request scheduling in consideration of interference to the adjacent base station.

The controller may exchange interference information of each beam pair with the adjacent base station.

In accordance with an aspect of the present disclosure, a method for allocating, by a base station, a resource in a dynamic time division duplex (TDD) system, the method includes: transmitting resource allocation information for an n+k-th TTI to a terminal at an n-th TTI, n being a natural number and k being a natural number; determining whether to change the resource allocation information, if a packet for a first service requiring low latency is required to be processed at the n+k-th TTI after transmitting the resource allocation information; and transmitting resource allocation change information indicating change of the resource allocation information to the terminal, if it is determined to change the resource allocation information to process the first service.

The TTI may be a subframe or slot or mini-slot.

The method may further include generating the resource allocation change information indicating to allocate downlink at a whole or part of the n+k-th TTI, if the packet is associated with downlink ultra reliable and low latency communication (URLLC) and uplink is allocated at the n+k-th TTI by the resource allocation information.

The method may further include generating first resource allocation change information indicating to allocate the downlink at a whole of the n+k-th TTI, if there is no Ack or Nack information to be transmitted at the n+k-th TTI or uplink URLLC resource is not allocated.

The method may further include generating second resource allocation change information indicating to allocate the downlink at part of the n+k-th TTI, if there is Ack or Nack information to be transmitted at the n+k-th TTI or uplink URLLC resource is allocated.

The method may further include transmitting information on a ratio of the uplink and the downlink allocated at the n+k-th TTI, associated with the second resource allocation change information to the terminal.

The method may further include transmitting an indicator indicating to ignore the resource allocation information to the terminal.

If the first service is operated at a first TTI, and a second service requiring a high data transmission rate is operated at a second TTI, the terminal performing the second service may receive downlink control information of the first TTI.

The method may further include receiving information on an uplink URLLC packet size together with a scheduling request (SR) from the terminal.

In accordance with another aspect of the present disclosure, a method for receiving, by a terminal, resource allocation in a dynamic time division duplex (TDD) system, the method includes: receiving resource allocation information for an n+k-th TTI from a base station at an n-th TTI, n being a natural number and k being a natural number; and receiving resource allocation change information indicating change of the resource allocation information from the base station, if a packet for a first service requiring low latency is required to be processed at the n+k-th TTI after receiving the resource allocation information.

The TTI may be a subframe or slot or mini-slot.

The resource allocation change information may indicate to allocate downlink at a whole or part of the n+k-th TTI, if the packet is associated with downlink URLLC and uplink is allocated at the n+k-th TTI by the resource allocation information.

The method may further include receiving information on a ratio of the uplink and the downlink allocated at the n+k-th TTI from the base station, if the resource allocation change information indicates to allocate the downlink at part of the n+k-th TTI.

The method may further include receiving an indicator indicating to ignore the resource allocation information from the base station.

The method may further include: receiving, by the terminal performing a second service, downlink control information of a first TTI, if the first service is operated at a first TTI, and the second service requiring a high data transmission rate is operated at a second TTI.

The method may further include transmitting information on an uplink URLLC packet size together with an SR to the base station.

In accordance with another aspect of the present disclosure, a base station allocating a resource in a dynamic TDD system, the base station includes: a transceiver; and a controller configured to control the transceiver to transmit resource allocation information for an n+k-th TTI to a terminal at an n-th TTI, n being a natural number and k being a natural number, determine whether to change the resource allocation information, if a packet for a first service requiring low latency is required to be processed at the n+k-th TTI after transmitting the resource allocation information, and control the transceiver to transmit resource allocation change information indicating change of the resource allocation information to the terminal, if it is determined to change the resource allocation information to process the first service.

The TTI may be a subframe or slot or mini-slot.

The controller may generate the resource allocation change information indicating to allocate downlink at a whole or part of the n+k-th TTI, if the packet is associated with downlink URLLC and uplink is allocated at the n+k-th TTI by the resource allocation information.

The controller may generate first resource allocation change information indicating to allocate downlink at a whole of the n+k-th TTI, if there is no Ack or Nack information to be transmitted at the n+k-th TTI or uplink URLLC resource is not allocated.

The controller may generate second resource allocation change information indicating to allocate downlink at part of the n+k-th TTI, if there is Ack or Nack information to be transmitted at the n+k-th TTI or uplink URLLC resource is allocated.

The controller may perform a control to transmit information on a ratio of the uplink and the downlink allocated at the n+k-th TTI, associated with the second resource allocation change information to the terminal.

The controller may perform a control to transmit an indicator indicating to ignore the resource allocation information to the terminal.

If the first service is operated at a first TTI, and a second service requiring a high data transmission rate is operated at a second TTI, the terminal performing the second service may receive downlink control information of the first TTI.

The controller may perform a control to receive information on an uplink URLLC packet size together with an SR from the terminal.

In accordance with another aspect of the present disclosure, a terminal receiving resource allocation in a dynamic TDD system, the terminal includes: a transceiver; and a controller configured to control the transceiver to receive resource allocation information for an n+k-th TTI from a base station at an n-th TTI, n being a natural number and k being a natural number, and control the transceiver to receive resource allocation change information indicating change of the resource allocation information from the base station, if a packet for a first service requiring low latency is required to be processed at the n+k-th TTI after receiving the resource allocation information.

The TTI may be a subframe or slot or mini-slot.

The resource allocation change information may indicate to allocate downlink at a whole or part of the n+k-th TTI, if the packet is associated with downlink URLLC and uplink is allocated at the n+k-th TTI by the resource allocation information.

The controller may control the transceiver to receive information on a ratio of the uplink and the downlink allocated at the n+k-th TTI from the base station, if the resource allocation change information indicates to allocate the downlink at part of the n+k-th TTI.

The controller may control the transceiver to receive an indicator indicating to ignore the resource allocation information from the base station.

If the first service is operated at a first TTI, and a second service requiring a high data transmission rate is operated at a second TTI, the controller may control the transceiver to receive downlink control information of the first TTI.

The controller may control the transceiver to transmit information on an uplink URLLC packet size together with an SR to the base station.

According to the aspects of the present disclosure, it is possible to rapidly share UL/DL configuration information with an adjacent base station, manage interference occurring due to the dynamic TDD based on the shared UL/DL configuration information, solve DL-to-UL interference problem to improve frequency efficiency by the dynamic TDD, and enable dynamic TDD operation on a subframe basis to support a low latency service.

According to another aspects of the present disclosure, by solving the low latency service support problem occurring due to pre-allocation of the subframe/slot type at the time of applying the dynamic TDD on a subframe/slot basis, it is possible to effectively support a vertical service (eMBB and URLLC), effectively support vertical services operated at different TTIs, and effectively support a vertical service in a multi-numerology system of a frequency division multiplex (FDM) method.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
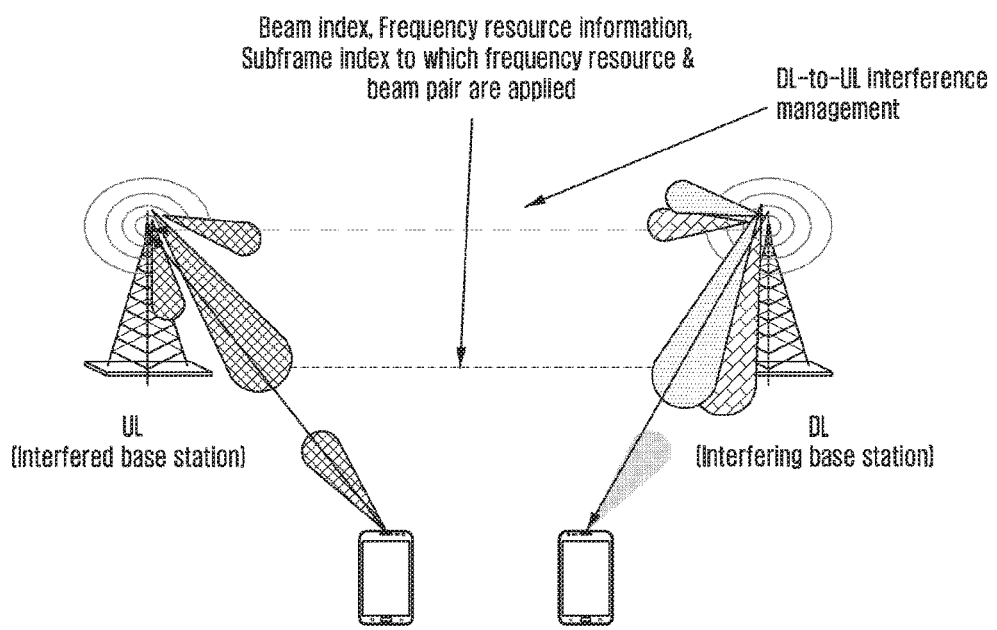
FIG. 1 illustrates an example of a method for managing downlink-to-uplink interference (DL-to-UL interference) using a wired (X2) interface.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Advantages and features of the present disclosure and methods to achieve them will be elucidated from embodiments described below in detail with reference to the accompanying drawings. However, the present disclosure is not limited to the preferred embodiment disclosed herein but will be implemented in various forms. The preferred embodiments make disclosure of the present disclosure thorough and are provided so that those skilled in the art can easily understand the scope of the present disclosure. Therefore, the present disclosure will be defined by the scope of the appended claims. Like reference numerals throughout the specification denote like elements.

First Embodiment

Hereinafter, embodiments of the present disclosure will be described in detail with reference to the accompanying drawings. In this regard, it is noted that like reference numerals denote like elements throughout the drawings. Moreover, detailed descriptions related to well-known functions or configurations will be ruled out in order not to unnecessarily obscure the gist of the present disclosure.

In describing embodiments, descriptions for features that are well known in the art to which the present disclosure pertains and are not directly related to the present disclosure will be omitted. This is to clarify the gist of the present disclosure clearly without obscuring it by way of omitting unnecessary descriptions.

For the same reason, some elements are exaggerated, omitted, or schematically illustrated in the accompanying drawings. Further, each element may have a size different from those shown in the drawings. The same reference numerals throughout the drawings denote the same or corresponding element.

Advantages and features of the present disclosure and methods to achieve them will be elucidated from embodiments described below in detail with reference to the accompanying drawings. However, the present disclosure is not limited to the preferred embodiment disclosed herein but will be implemented in various forms. The preferred embodiments make disclosure of the present disclosure thorough and are provided so that those skilled in the art can easily understand the scope of the present disclosure. Therefore, the present disclosure will be defined by the scope of the appended claims. Like reference numerals throughout the specification denote like elements.

It will be understood that each block in flowcharts and combinations of the flowcharts may be performed via computer program instructions. These computer program instructions may be installed in processors of special computers or other programmable data processing equipment, thus the instructions performed through the processors of the computer or other programmable data processing equipment may generate a means for performing functions described in a block(s) of the flow chart. These computer program instructions may also be stored in a computer-readable memory that may direct a computer or other programmable data processing equipment to implement functions in a particular manner, such that the instructions stored in the computer-readable memory produce an article of manufacture including the instruction means that implements the function described in the block(s) of the flowcharts. The computer program instructions may also be loaded onto a computer or other programmable data processing equipment to cause a series of operations to be performed on the computer or other programmable data processing equipment to produce a process executed by the computer such that the instructions executed on the computer or other programmable data processing equipment may also provide steps for implementing the functions described in the block(s) of the flowcharts.

Further, the respective block may indicate parts of modules, segments, or codes including one or more executable instructions for performing specific logical function(s). Further, it should be noted that the functions mentioned in the blocks may be performed in different order in several alternative embodiments. For example, two blocks illustrated successively may be performed substantially at the same time, or may be performed in reverse order according to their functions.

Here, a term "unit" used in the embodiments of the disclosure means, but is not limited to, a software or hardware element such as a field programmable gate array (FPGA) or application specific integrated circuit (ASIC), which performs certain roles. However, the term "unit" is not limited to software or hardware. A "unit" may be configured to reside on an addressable storage medium or configured to execute one or more processors. Thus, a "unit" may include, for example, elements, such as software elements, object-oriented software elements, class elements and task elements, processes, functions, attributes, procedures, subroutines, segments of a program code, drivers, firmware, microcode, circuitry, data, databases, data structures, tables, arrays, and variables. Functions provided in the elements and the "units" may be combined into fewer elements and "units" or further separated into additional elements and "units". In addition, the elements and "units" may also be implemented such that they execute one or more CPUs in a device or a secure multimedia card.

Since commercialization of the 4G communication system, there has been an effort to develop an improved 5G communication system.

A main feature of the 5G communication system is to support various service scenarios having different requirements as compared to the 4G communication system. Here, the requirement may mean latency, a data rate, a battery life, the number of users simultaneously accessing, coverage, and the like.

For example, an enhanced mobile broad band (eMBB) service aims to implement a data rate higher 100 times or more as compared to the 4G communication system, and is a service for supporting data traffic of users that rapidly increases.

As another example, an ultra reliable and low latency service (URLL) aims to provide very high data transmission/reception reliability and very low latency as compared to the 4G communication system, and may be usefully used in autonomous vehicles, e-health, drones, and the like.

As another example, a massive machine-type-communication (mMTC) service aims to support communications between the larger number of devices per area as compared to the 4G communication system, and is an evolved service of the 4G MTC such as smart metering.

The present disclosure relates to a method and an apparatus capable of solving a problem of downlink-to-uplink interference (DL-to-UL interference) occurring due to dynamic time division duplex (TDD) applied in order to decrease frequency efficiency and latency in an environment in which various services capable of supporting such a 5G communication system coexist.

FIG. 1 illustrates an example of a method for managing DL-to-UL interference using an existing wired (X2) interface. FIG. 1 shows a concept of the method for managing DL-to-UL interference based on coordinated beamforming using the X2 interface.

Referring to FIG. 1, the first base station (or interfered base station) may receive an uplink signal from the terminal, and the second base station (or interfering base station) may transmit a downlink signal to another terminal. At this time, the downlink signal transmitted by the second base station may act as interference with the first base station.

The first base station may transmit information of a subframe to which a frequency resource and beam pair are applied to the second base station by considering information of frequency resource to be used by the first base station in uplink and reception beam index and that different UL/DL configurations are applied to each base station. The second base station may perform DL-to-UL interference management using frequency domain information and spatial domain information together. That is, the second base station checks a degree of DL-to-UL interference with the base station by using beam index information and frequency allocation information. At this time, information on influence of interference of each beam index pair (for example, a table for influence of interference of each beam index pair) may be shared between the second base station and the first base station. In consideration of a downlink beam index of the second base station, frequency resource and uplink beam index of the first base station, and the like, the second base station may select a terminal (user equipment, UE) with less interference influence and allocate the corresponding terminal to a specific RB {xi} resource, or select a beam index with less interference influence on a specific terminal (UE) allocated to a corresponding RB {xi} resource. Even when a beam index is adjusted, if there is no terminal (UE) with less interference influence by interference, the second base station avoids scheduling on the corresponding RB {xi}.

Figure 2:
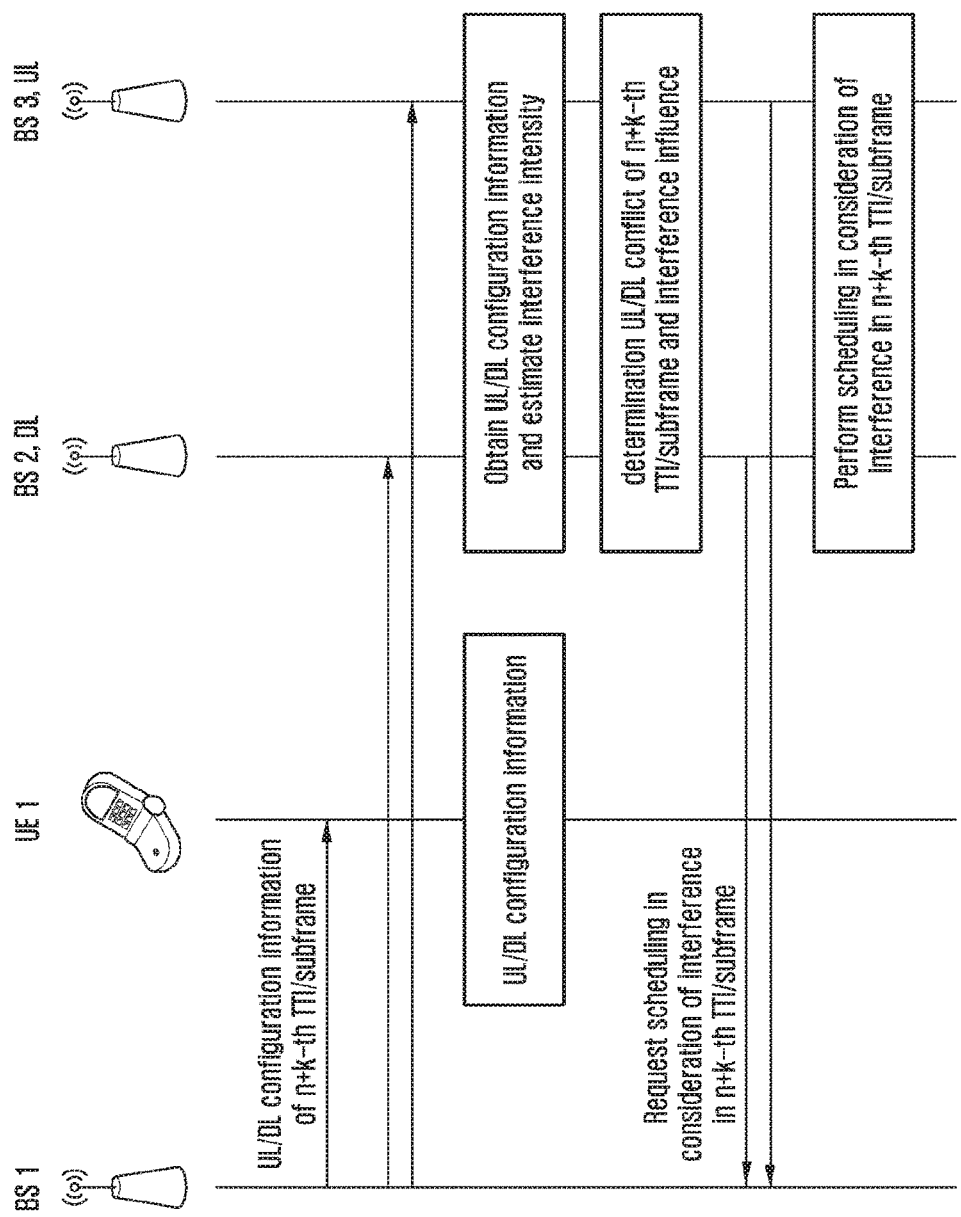
FIG. 2 illustrates an example of a method for managing dynamic time division duplex (TDD) interference using a self-interference cancellation function of a base station according to a first embodiment of the present disclosure.

FIG. 2 illustrates an example of a method for managing dynamic TDD interference using a self-interference cancellation (SIC) function of a base station according to the first embodiment of the present disclosure. Referring to FIG. 2, each base station BS 1, BS 2, and BS 3 may apply the SIC function to estimate interference intensity of an adjacent base station and obtain UL/DL configuration information of the adjacent base station, and then perform DL-to-UL interference management in coordination with the adjacent base station based on the estimated interference intensity of the adjacent base station and the UL/DL configuration information. Each base station BS1, BS 2, and BS 3 is operated as a service node (e.g., UE) of an adjacent base station to thereby obtain UL/DL configuration information of an adjacent base station. Obtaining UL/DL configuration information of a specific base station means that the specific base station may be operated as an interfering base station. Referring to FIG. 2, first, a first base station BS 1 transmits UL/DL configuration information of a (n+k)-th transmission time interval (TTI) to a terminal UE 1 in a cell at an n-th TTI (subframe/slot). Adjacent base stations BS 2 and BS 3 may listen to the UL/DL information transmitted through air. A third base station BS 3 (UL) may receive UL/DL configuration information from the first base station together with uplink information of the terminal in the cell, and the second base station BS 2 (DL) may receive UL/DL configuration information from the first base station BS 1 while transmitting downlink information of the terminal in the cell using the SIC function. That is, the adjacent base stations BS2 and BS3 detect air information transmitted from the specific base station BS1 to obtain UL/DL configuration information and estimate interference intensity thereby. Each of the adjacent base stations BS 2 and BS 3 may determine interference influence based on the UL/DL configuration information of the specific base station BS 1 and their UL/DL configuration information. If each of the adjacent base stations BS 2 and BS 3 determines that interference occurs due to UL/DL conflict, it is possible to request scheduling in consideration of interference in (n+k)-th TTI/subframe to the specific base station BS1.

Then, each of the adjacent base stations BS 2 and BS 3 may determine whether the UL/DL conflict occurs using UL/DL information of a (n+k)-th TTI of the specific base station BS 1 received at the current (n)-th TTI and UL/DL information of the (n+k)-th TTI (subframe/slot) of the corresponding base station, and directly perform the scheduling in consideration of interference based on the determination result.

Figure 3:
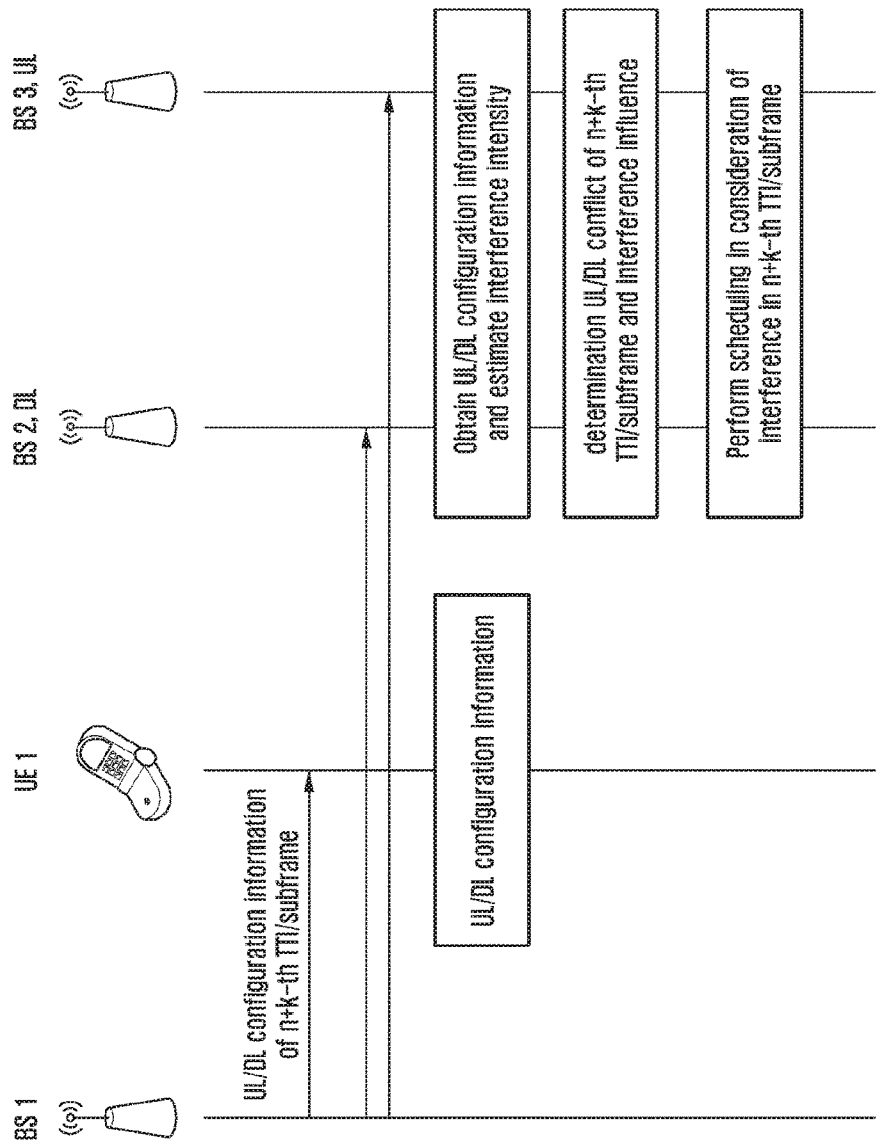
FIG. 3 illustrates another example of the method for managing dynamic TDD interference using the self-interference cancellation function of the base station according to the first embodiment of the present disclosure.

FIG. 3 illustrates an example of a method for managing dynamic TDD interference using a SIC function of a base station according to the first embodiment of the present disclosure.

Referring to FIG. 3, first, a specific base station BS 1 transmits UL/DL configuration information of a (n+k)-th TTI to a terminal UE 1 in a cell at an n-th TTI. Adjacent base stations BS 2 and BS 3 may listen to the UL/DL configuration information transmitted through air. A third base station BS 3 may receive UL/DL configuration information from the first base station BS 1 together with uplink information of the terminal in the cell, and the second base station BS 2 may receive UL/DL configuration information from the first base station while transmitting downlink information of the terminal in the cell using the SIC function. That is, the adjacent base stations BS 2 and BS 3 detect air information transmitted from the specific base station BS 1 to obtain UL/DL configuration information of the specific base station BS 1 and estimate interference intensity. The adjacent base stations BS 2 and BS 3 may determine whether the UL/DL conflict occurs using UL/DL information of a (n+k)-th TTI of an adjacent base station BS 1 received at the current (n)-th TTI and UL/DL information of the (n+k)-th TTI of the corresponding base station, and perform the scheduling in consideration of interference based on the determination result.

FIGS. 4A to 4D illustrate an example of scheduling for interference management using UL/DL configuration information of an adjacent base station according to the first embodiment of the present disclosure.

Figure 4A:
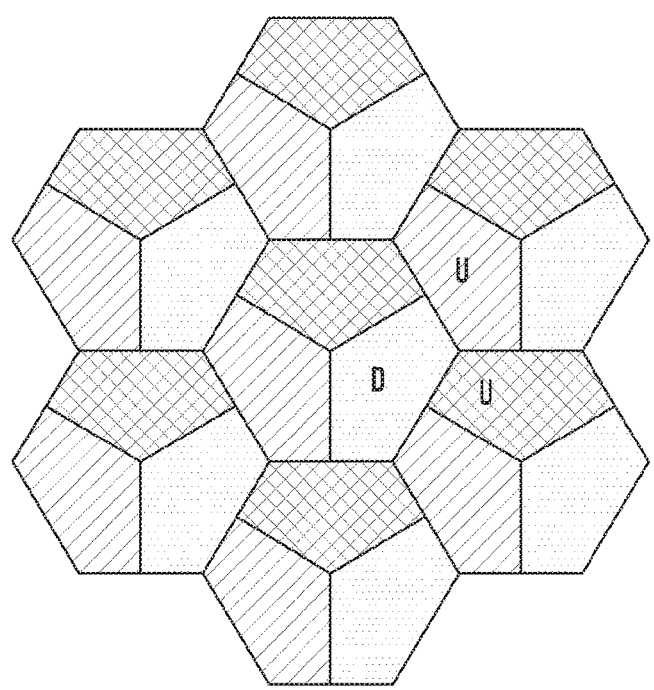
FIGS. 4A-4D illustrate an example of interference management scheduling using UL/DL configuration information of an adjacent base station according to the first embodiment of the present disclosure.
Figure 4B:
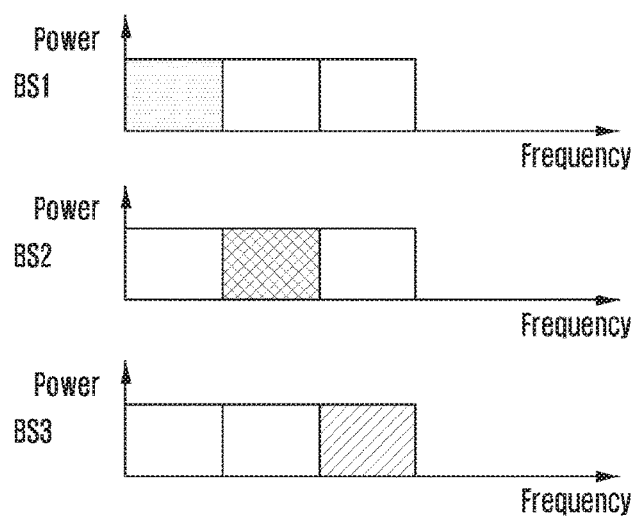

Referring to FIG. 4A, the base station may be operated in a multi-cell environment in the wireless communication system. Referring to FIG. 4B, an orthogonal resource may be allocated to each base station BS 1, BS 2, and BS 3 in advance.

Figure 4C:
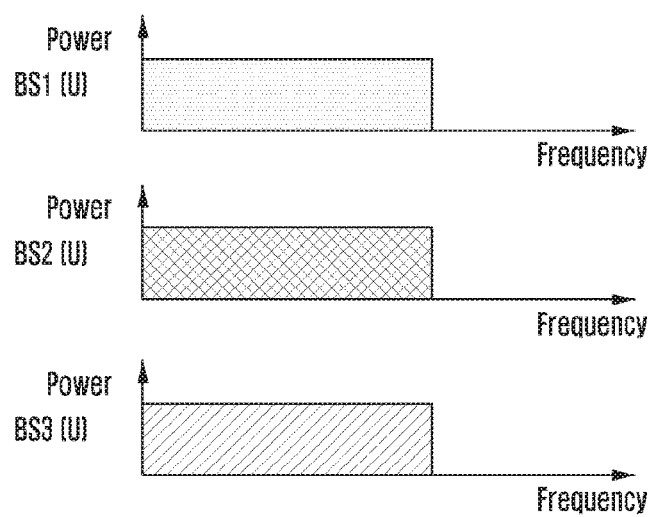
Figure 4D:
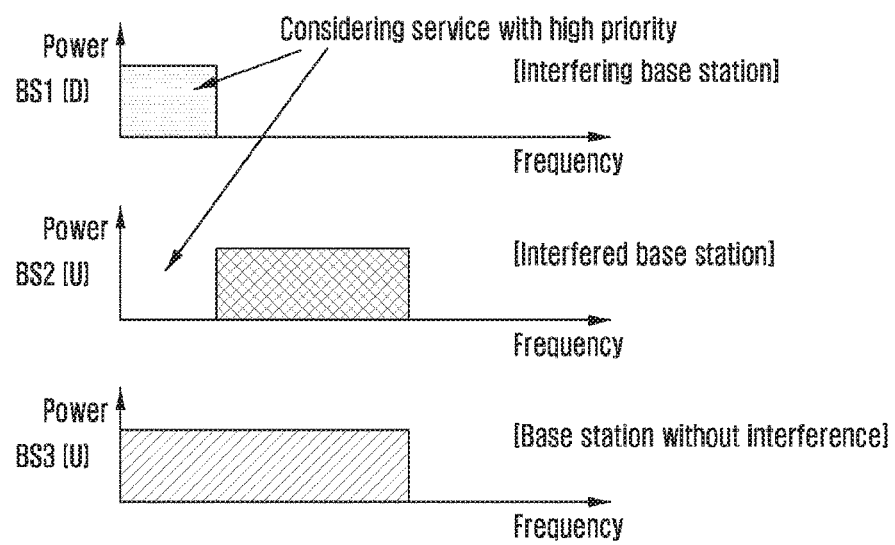

FIG. 4C illustrates resource allocation in a case in which the dynamic TDD is not applied, and FIG. 4D is a diagram illustrating resource allocation in a case in which the dynamic TDD is applied to support a low latency service. Referring to FIGS. 4C and 4D, in a case in which base stations use the same UL/DL configuration, all base stations are operated in frequency reuse 1, and when the first base station BS 1 uses a UL subframe as a DL subframe by applying the dynamic TDD in order to support a low latency service, the second base station BS 2 among base stations using the UL subframe as it is preferentially allocates a UE to the remaining resources except for an orthogonal resource allocated to the first base station BS 1. At this time, the third base station BS3 that is not interfered may perform scheduling using all resources identically to a case in which an adjacent base station does not apply the dynamic TDD.

Figure 5:
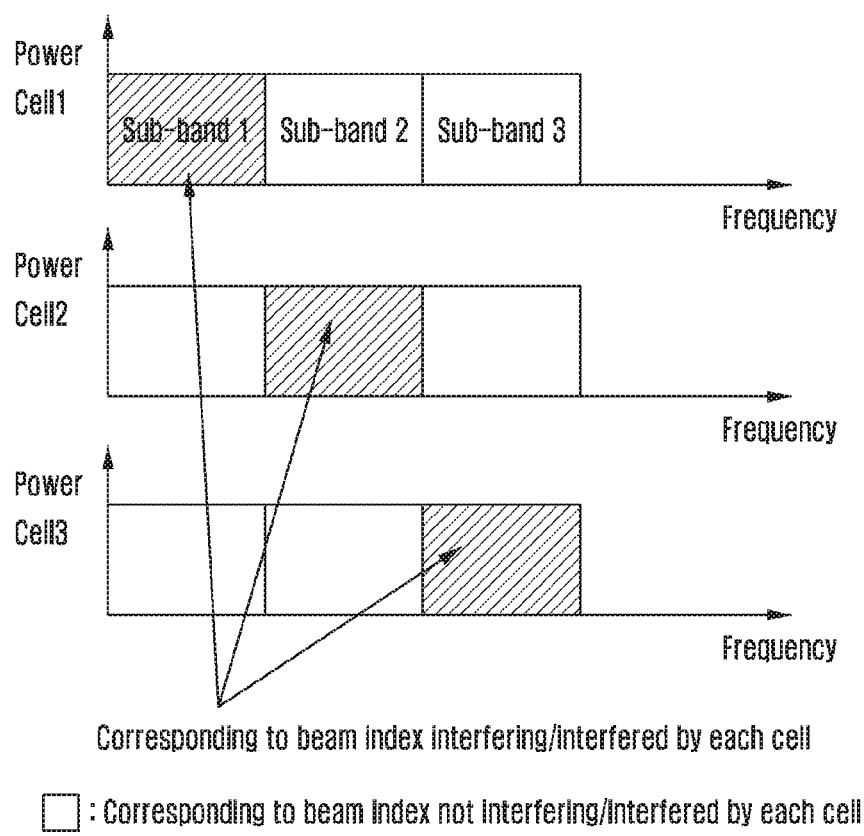
FIG. 5 illustrates another example of interference management scheduling using UL/DL configuration information of an adjacent base station according to the first embodiment of the present disclosure.

FIG. 5 illustrates another example of scheduling for interference management using UL/DL configuration information of an adjacent base station according to the first embodiment of the present disclosure. When an adjacent base station obtains information on a change of UL/DL configuration of a specific TTI (subframe/slot) through an air channel, if a beam index interfering or interfered by the adjacent base station is determined as a best beam index of a specific user, signal transmission and reception between the base station and a terminal are performed using a specific frequency ban (sub-band 1 in a case of cell 1) allocated to each cell.

If a beam index not causing interference is determined as a best beam index of the specific user, signal transmission and reception between the base station and the terminal are performed using the remaining sub-frequency bands (sub-bands 2 and 3 in the case of cell 1). Only when using the beam index interfering or interfered by the sub-bands 2 and 3 and a cell 2 and/or cell 3, managed beam index and used frequency information is transmitted to the adjacent base station. A beam index using each sub-band may be selected or determined based on a constructed or shared DL-to-UL interference table.

There are various alternatives for the interference channel intensity estimation and UL/DL configuration information transmission method, which will be described as below.

In a first method (method I), interference intensity is estimated using a tracking reference signal (TRS)/ a measurement reference signal (MRS)/ a channel state information reference signal (CSI-RS)/ a cell-specific reference signal (CRS), and the like, and UL/DL configuration is transmitted using a physical downlink channel (PDCCH). If estimating the interference intensity based on the TRS/MRS/CSI-RS/CRS, it is possible to check interference intensity for the entire band. The UL/DL configuration information is obtained by performing PDCCH decoding using channel information estimated based on the TRS/MRS/CSI-RS/CRS. At this time, it is required to share in advance a system information radio network temporary identifier (SI-RNTI)/x-RNTI information for decoding cyclic redundancy check (CRC) scrambled PDCCH information between adjacent base stations. Here, the x-RNTI means an RNTI of a terminal belonging to the adjacent base station.

In a second method (method II), interference intensity is estimated based on a demodulation RS (DMRS), and UL/DL configuration is transmitted through a PDCCH. Through the estimation of the interference intensity based on the DMRS, it is possible to check interference intensity for some band, and UL/DL configuration information is obtained by performing PDCCH decoding using channel information estimated based on the DMRS. It is required to share in advance an SI-RNTI/x-RNTI information for decoding CRC scrambled PDCCH information between adjacent base stations.

In a third method (method III), interference intensity is estimated using an TRS/MRS/CSI/CRS, and UL/DL configuration is transmitted through a DMRS-based PDCCH. The interference intensity is estimated based on the TRS/MRS/CSI-RS/CRS, and the UL/DL configuration information is obtained by performing PDCCH decoding using channel information estimated based on the DMRS. It is required to share in advance an SI-RNTI/x-RNTI information for decoding CRC scrambled PDCCH information between adjacent base stations.

In a fourth method (method IV), a CSI-RS for measuring DL-to-UL interference intensity is transmitted, and the interference intensity is estimated based on the CSI-RS, and an adjacent base station-specific PDCCH/dedicated resource for transmitting UL/DL configuration information to an adjacent base station is allocated. A CSI process for measuring DL-to-UL interference needs to be operated, a PDCCH (DCI) or PDSCH to the adjacent base station is allocated, and UL/DL configuration information is transmitted through the PDCCH or PDSCH. The x-RNTI is shared with the adjacent base station, scrambling is performed based on the sharing, and blind decoding is performed using the scrambling. Here, the x-RNTI means an RNTI allocated by a specific base station to an adjacent base station.

A fifth method (method V) is a method in which a new radio channel for transmitting UL/DL configuration information is designed. In the method V, a physical resource for transmitting UL/DL configuration information is allocated to each base station, and if there is UL/DL configuration, broadcasting is performed using the resource, thereby exchanging the UL/DL configuration information. A more detailed embodiment will be described with reference to FIGS. 8 and 9.

Figure 6:
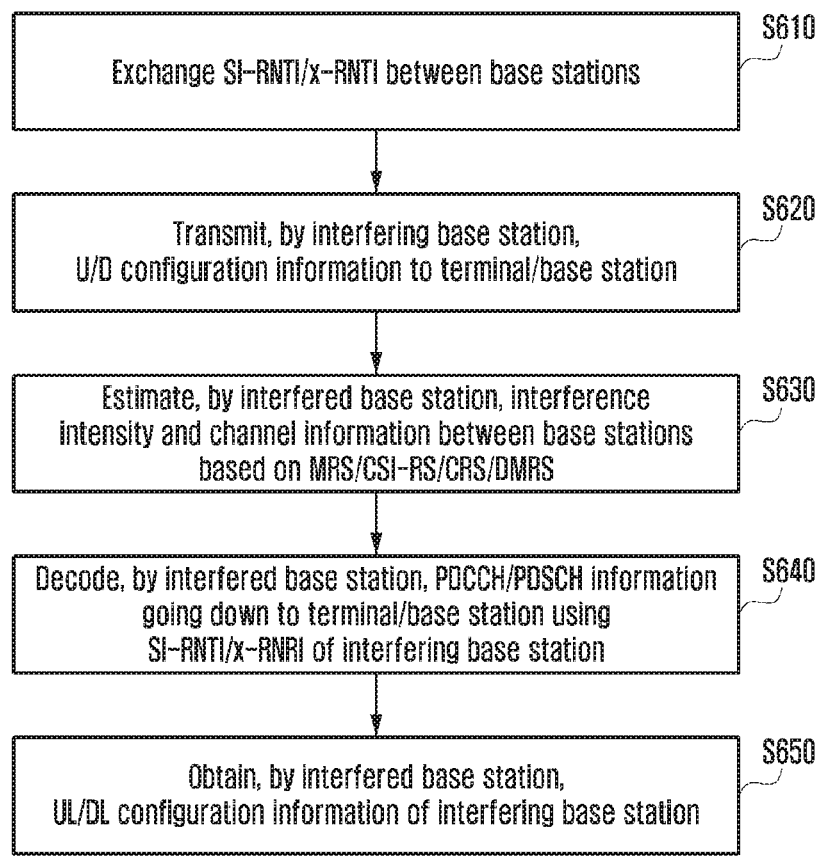
FIG. 6 illustrates an example of a procedure for estimating interference intensity and obtaining UL/DL configuration information according to the first embodiment of the present disclosure.

FIG. 6 illustrates an example of a procedure for estimating interference intensity and obtaining UL/DL configuration information according to the first embodiment of the present disclosure.

Referring to FIG. 6, in order to estimate interference intensity and obtain UL/DL configuration information, first, an SI-RNTI or x-RNTI is exchanged between base stations (610). The x-RNTI refers to RNTI information for decoding a downlink control indicator (DCI) including UL/DL configuration information.

Then, an interfering base station transmits UL/DL configuration information to an adjacent terminal/base station (620). An interfered base station estimates interference intensity and channel information between base stations based on an MRS/CRI-RS/CRS/DMRS (630). Then, the interfered base station decodes PDCCH/PDSCH information transmitted to the adjacent terminal/base station using the SI-RNTI or x-RNTI of the interfering base station (640). Through this, the interfered base station obtains the UL/DL configuration information of the interfering base station (650).

Figure 7A:
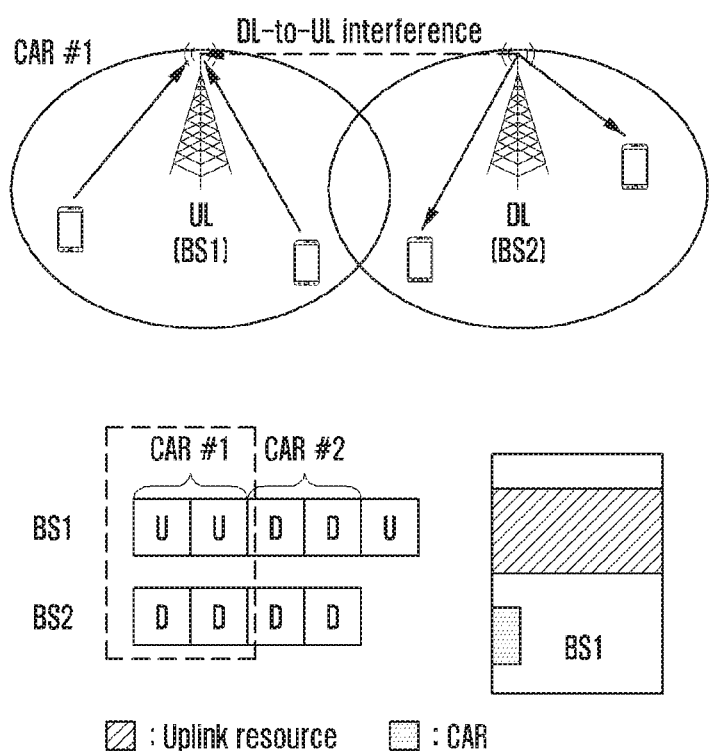
FIGS. 7A and 7B illustrate an example of configuration information transmission resource allocation according to the first embodiment of the present disclosure.
Figure 7B:
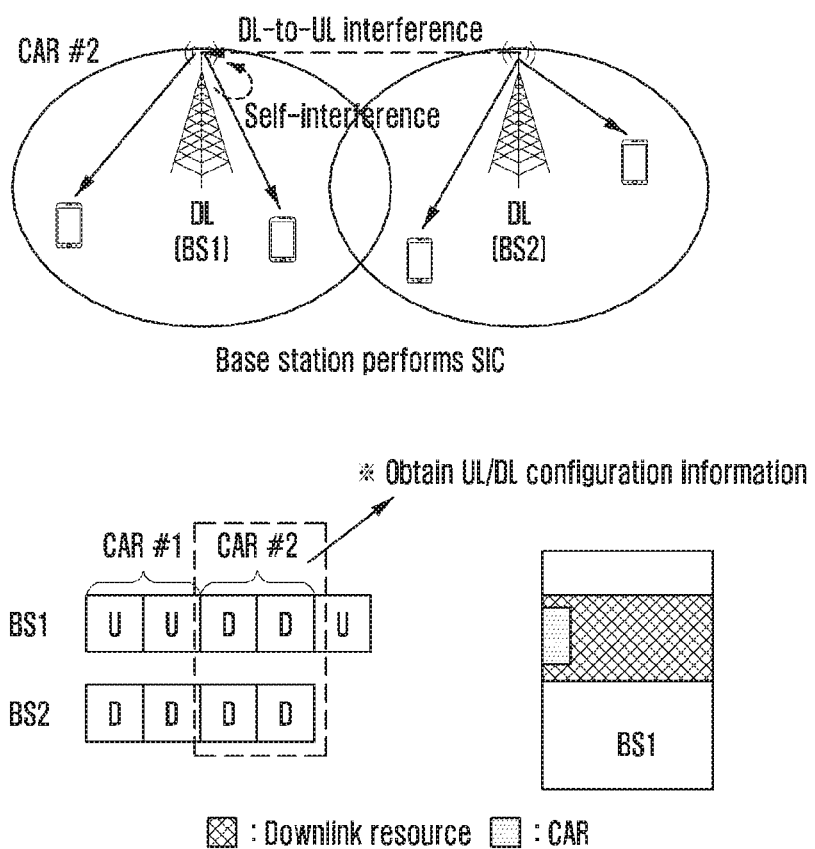

FIGS. 7A and 7B illustrate an example of configuration information transmission resource allocation according to the first embodiment of the present disclosure. FIGS. 7A and 7B are concept diagrams showing that a method for receiving interference intensity and configuration information may vary depending on UL/DL configuration of base stations.

As described above, there may be various methods for transmitting, by a potential interfering base station BS2, UL/DL configuration information to an adjacent base station. A method for receiving the UL/DL information according to current UL/DL configuration of the base stations, and a method for resource allocation for reception of the UL/DL information may variously exist.

A resource (resource to be emptied) allocated by a potential interfered base station for receiving UL/DL configuration information transmitted from an interfering base station is referred to as a configuration acquisition resource (CAR). A CAR may be periodically allocated, and allocated per subframe/TTI or per several to tens of subframe/TTI. A CAR allocation period may vary depending on a UL/DL configuration change period of the dynamic TDD.

Further, information on a resource through which UL/DL configuration information is transmitted from each base station may be shared between base stations in advance. The interfered base station needs to be able to receive UL/DL configuration information of an adjacent base station by managing resources in consideration of the CAR. There are two primary alternatives.

A first method is a method of emptying some DL/UL resources (RB/RE) in consideration of CAR resource allocation at the time of performing DL/UL by the interfered base station. In the first method, even at the time of performing DL, some resources are emptied, such that influence by a self-interference signal may be reduced.

A second method is a method of emptying some UL resources (RB/RE) in consideration of CAR resource allocation only at the time of performing UL. In the second method, resource allocation is performed independently of the configuration CAR at the time of performing DL. That is, at this time, a DL data resource may overlap a CAR. A DL signal is information known by the base station, if perfect removal is possible, UL/DL information transmitted from an adjacent base station may be decoded. If an orthogonal resource is not secured at the time of performing UL, a UL/DL configuration signal transmitted from the adjacent base station may act as interference on data information transmitted from an UE in a cell, as a result, the data transmitted from the UE in the cell may not be properly decoded. Therefore, there is a need to empty some UL resources in consideration of the configuration CAR.

Figure 8:
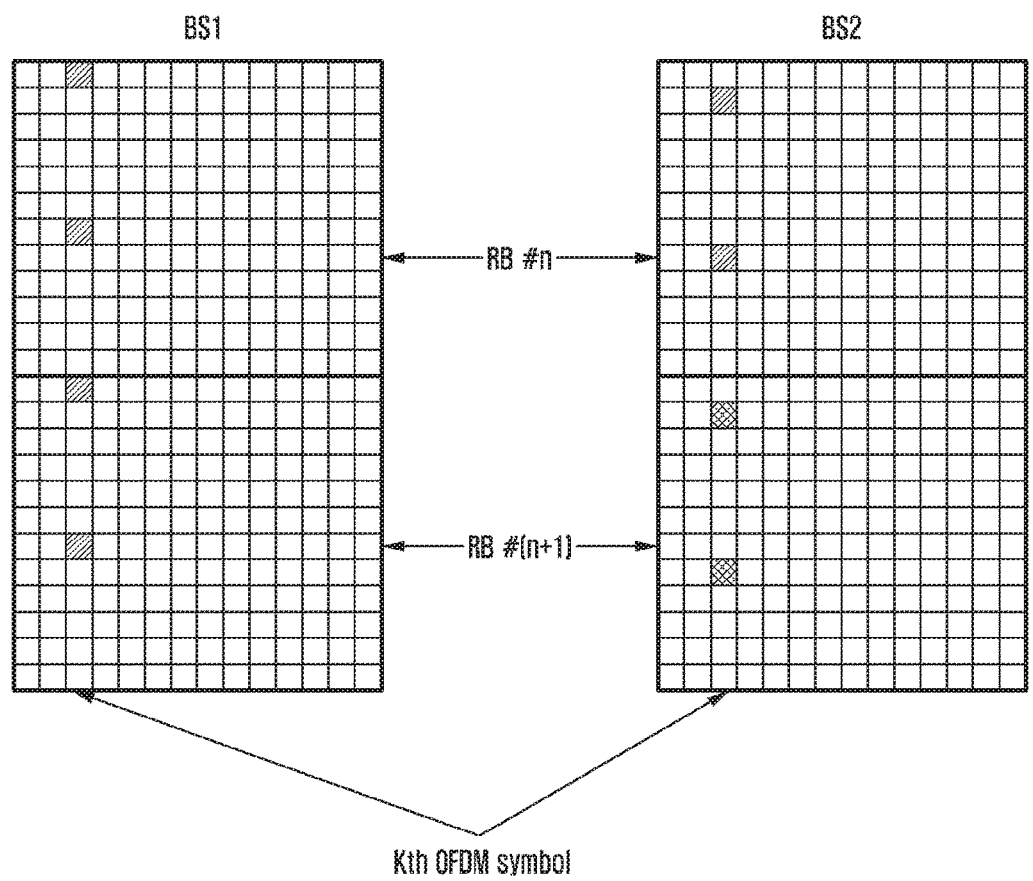
FIG. 8 illustrates an example of UL/DL configuration information transmission channel resource allocation according to the first embodiment of the present disclosure.

FIG. 8 illustrates an example of UL/DL configuration information transmission channel resource allocation according to the first embodiment of the present disclosure. FIG. 8 is an embodiment of the "method V" described above. In the embodiment of FIG. 8, all base stations are allocated with the same RB resource, and a resource element is allocated while shifting according to a cell ID. That is, an orthogonal resource is allocated based on a cell ID. In another method, a resource may be allocated based on a cell ID, a bandwidth, a subframe index, and the like. Information to be transmitted through the allocated resource is UL/DL configuration information, and may be transmitted by the following two methods.

Alt. 1: Power based indication

Transmitting an allocated resource with power if there is a change from basic U/D configuration Transmitting nothing if there is no change from basic U/D configuration Alt. 2: Transmitting 1 or −1

Transmitting 1 to the allocated resource if there is a change from basic U/D configuration Transmitting −1 to the allocated resource if there is no change from basic U/D configuration When four subframe structures exist, UL/DL configuration information may be transmitted to an adjacent base station by expressing a bit for each RB or expressing an additional bit using an additional OFDM symbol. Further, the same rule may be applied even for four or more subframe structures.

Figure 9:
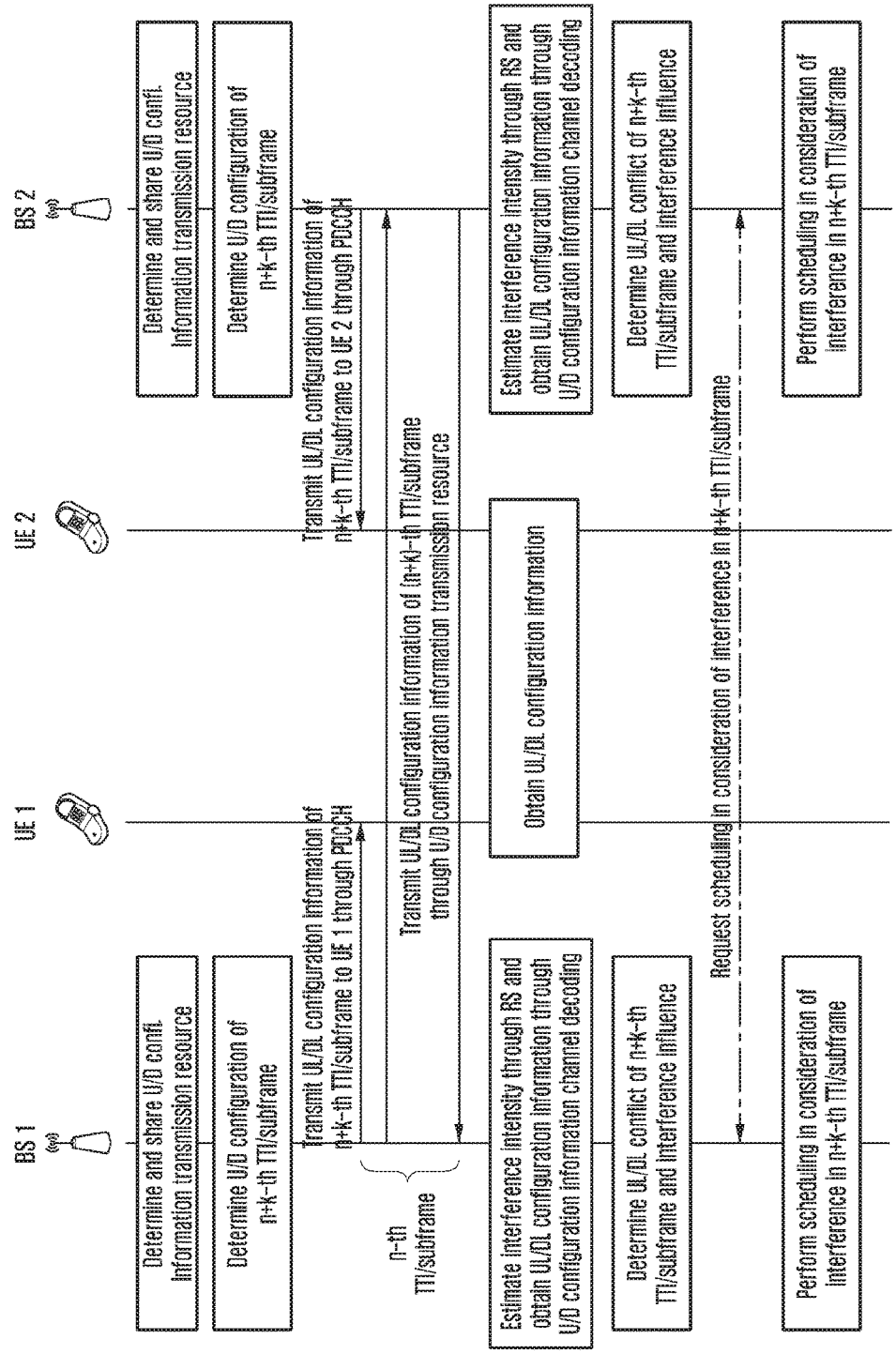
FIG. 9 illustrates an example of a procedure for managing interference using a UL/DL configuration information transmission channel according to the first embodiment of the present disclosure.

FIG. 9 illustrates an example of a procedure for managing interference using a new UL/DL configuration information transmission channel according to the first embodiment of the present disclosure. FIG. 9 is an embodiment of the "method V" described above. First, each base station determines and shares resources of a new channel for transmitting UL/DL configuration information, and transmits UL/DL configuration information of a (n+k)-th subframe/TTI to service terminals through a PDCCH.

At the same time, UL/DL configuration information of (n+k)-th TTI/subframe is transmitted through a UL/DL configuration information transmission resource. Then, each base station estimates interference intensity through an RS, obtains UL/DL configuration information through UL/DL configuration information channel decoding, and determines UL/DL conflict and interference influence of the (n+k)-th TTI/subframe. Each base station performs scheduling in consideration of interference at the (n+k)-th TTI/subframe based on the determination result. Further, it is also possible to request scheduling in consideration of interference at the (n+k)-th TTI/subframe to an adjacent base station as needed.

Figure 10:
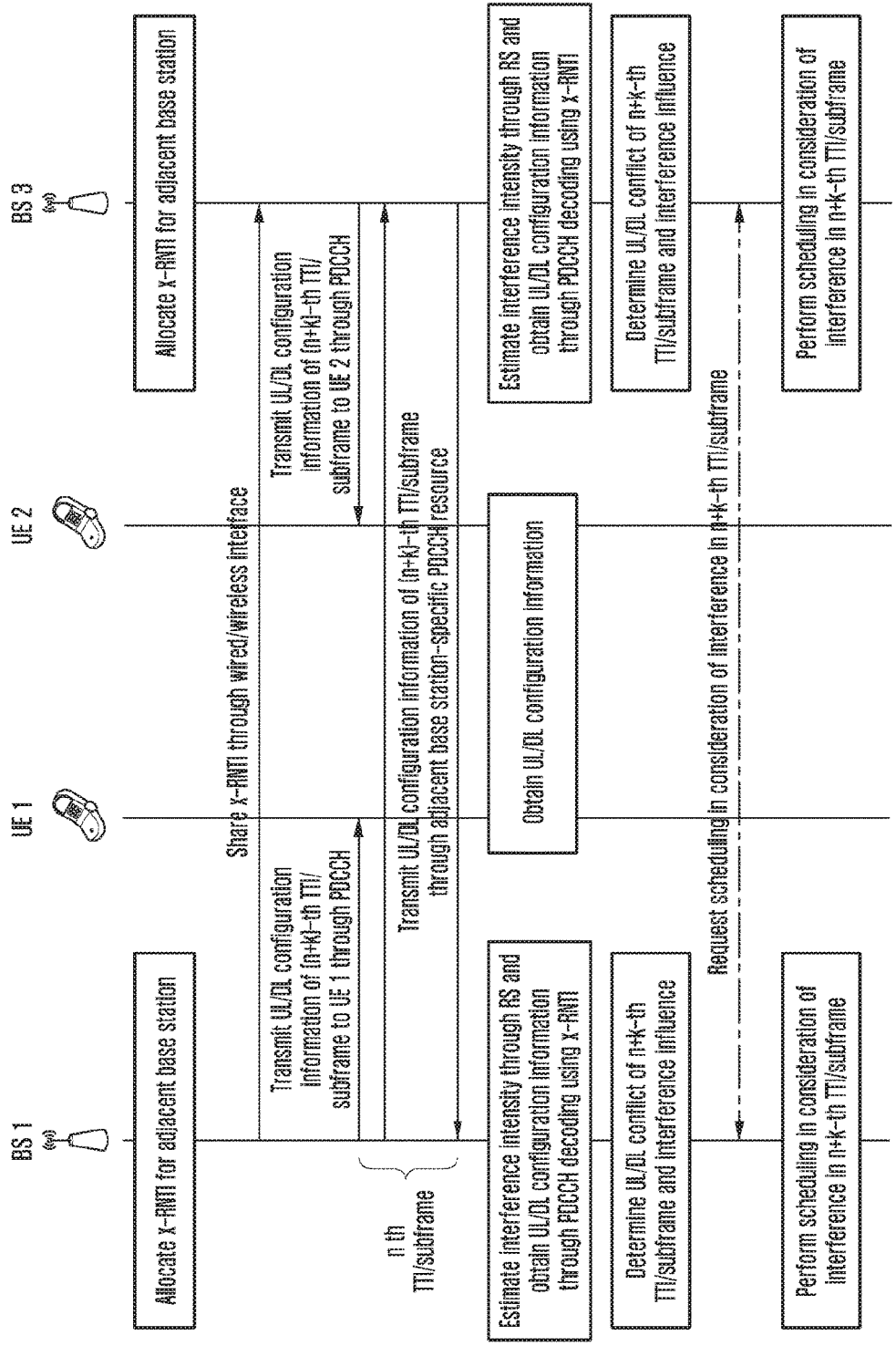
FIG. 10 illustrates an example of a procedure for transmitting UL/DL configuration information using a PDCCH and managing interference according to the first embodiment of the present disclosure.

FIG. 10 illustrates an example of a procedure for transmitting UL/DL configuration information using a PDCCH and managing interference according to the first embodiment of the present disclosure. FIG. 10 is an embodiment of the "method IV" described above. First, each base station allocates an x-RNTI for an adjacent base station, and shares/transmits x-RNTI information through a wired/wireless interface. In an n-th TTI/subframe, each base station transmits UL/DL configuration information of a (n+k)-th subframe/TTI to service terminals through a PDCCH.

Then, each base station transmits UL/DL configuration information of (n+k)-th TTI/subframe through an adjacent base station-specific PDCCH resource. UL/DL configuration information transmitted to a service terminal and an adjacent base station at an n-th TTI/subframe may simultaneously include configuration information from the (n+k)-th TTI/subframe to an (n+k+m)-th TTI/subframe in consideration of configuration of an (n+1)-th subframe/TTI to an (n+k−1)-th subframe/TTI. Further, information of a service type (URLLC, eMBB, and the like) to be supported at the (n+k)-th TTI/subframe may be included. Priority may be assigned at the time of resource allocation using the service type information. If there is a wired link with low latency, service type information may be transmitted through the wired link together with UL/DL configuration information.

Then, each base station estimates interference intensity through an RS, obtains UL/DL configuration information through UL/DL configuration information channel decoding, and determines UL/DL conflict and interference influence of the (n+k)-th TTI/subframe. Scheduling in consideration of interference is performed at the (n+k)-th TTI/subframe based on the determination result. Further, each base station may also request scheduling in consideration of interference at the (n+k)-th TTI/subframe to an adjacent base station as needed. If the service information is transmitted together at the time of transmitting U/D configuration information of the (n+k)-th TTI/subframe through the adjacent base station-specific PDCCH resource, this information may be used for scheduling.

Figure 11:
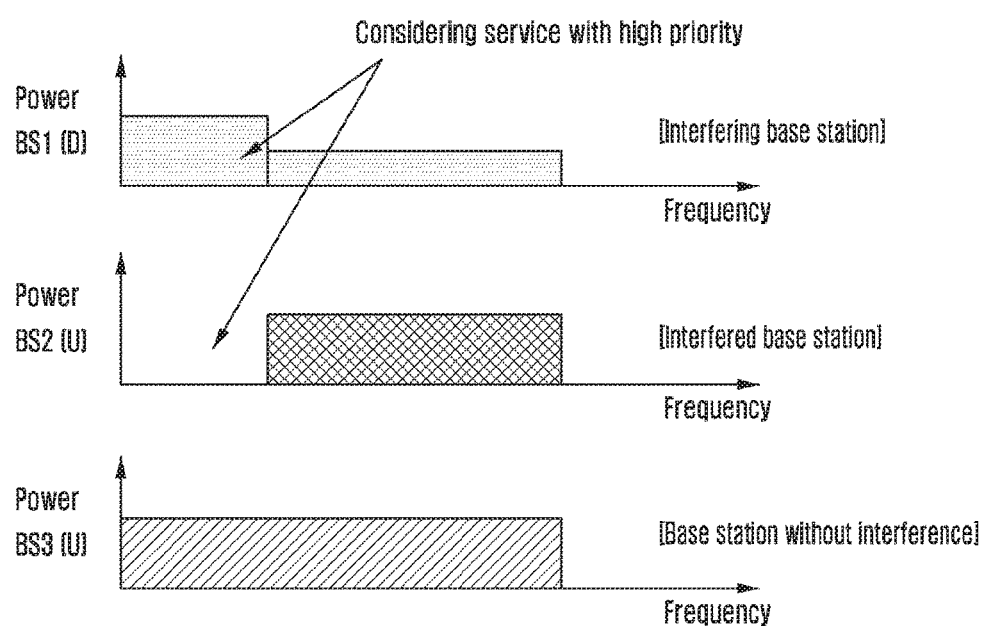
FIG. 11 illustrates interference management scheduling according to the procedure illustrated in FIG. 10 according to the first embodiment of the present disclosure.

FIG. 11 illustrates interference management scheduling according to the procedure illustrated in FIG. 10 according to the first embodiment of the present disclosure.

Referring to FIG. 11, if an adjacent base station BS1 supports an URLLC service, the corresponding base station is prioritized and a resource of BS2 is emptied as illustrated in FIG. 11, and if the adjacent base station BS2 support an eMBB service, the BS1 performs user allocation to the corresponding resource in consideration of interference with the corresponding base station. DCI information exchanged between adjacent base stations through a PDCCH is UL/DL configuration information and service type information as described above. In transmitting such information, there are various options as below.

Alt. 1: U/D configuration information of (n+k)-th TTI/subframe

Alt. 2: U/D configuration information of (n+k), (n+k+1), . . . , (n+k+m)-th TTI/subframes Here, m is an integer greater than 0 (m>0).

Figure 12:
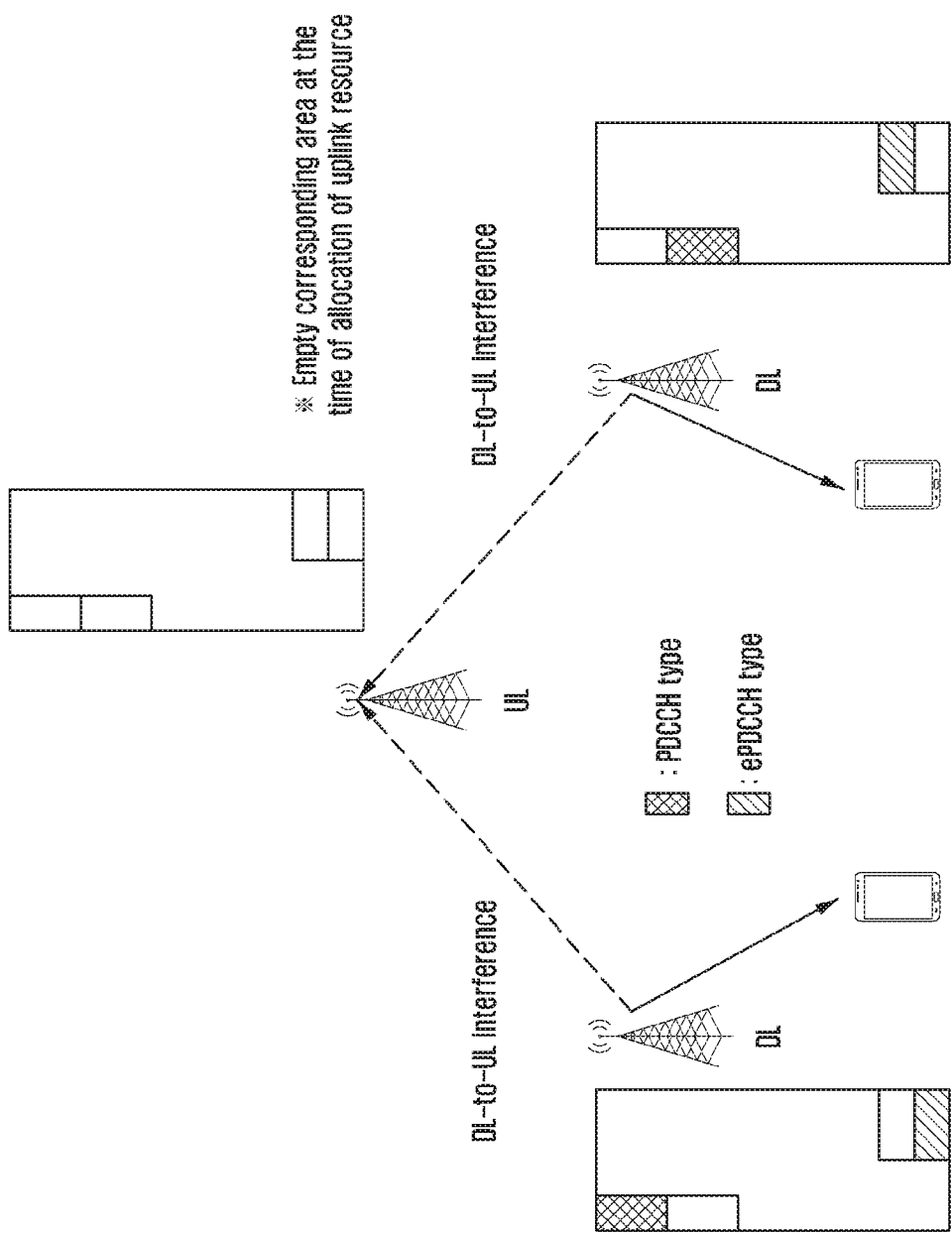
FIG. 12 illustrates an example of a resource allocation method at the time of transmitting UL/DL configuration through a downlink control indicator (DCI) according to the first embodiment of the present disclosure.

Alt. 3: U/D configuration information+service type information of (n+k)-th TTI/subframe Service type information: 2 bits/3 bits are available When 2 bits are used, 00: eMBB, 01: URLLC, 10: mMTC, 11: reserved Alt. 4: U/D configuration information+service type information of (n+k), (n+k+1), . . . , (n+k+m)-th TTI/subframes FIG. 12 illustrates an example of a resource allocation method at the time of transmitting UL/DL configuration through a DCI according to the first embodiment of the present disclosure. As shown in FIG. 12, there is a method for allocating an orthogonal resource for each base station. Each base station transmits UL/DL configuration to a terminal in a cell using an orthogonal resource with an adjacent base station. By doing so, an interfered base station may accurately check influence of each interfering base station.

There are two methods according a resource used at the time of transmitting UL/DL configuration. A first method is a method in which transmission is made using an orthogonal resource in a form of PDCCH, and a second method is a method in which transmission is made using an orthogonal resource in a form of E-PDCCH.

Figure 13:
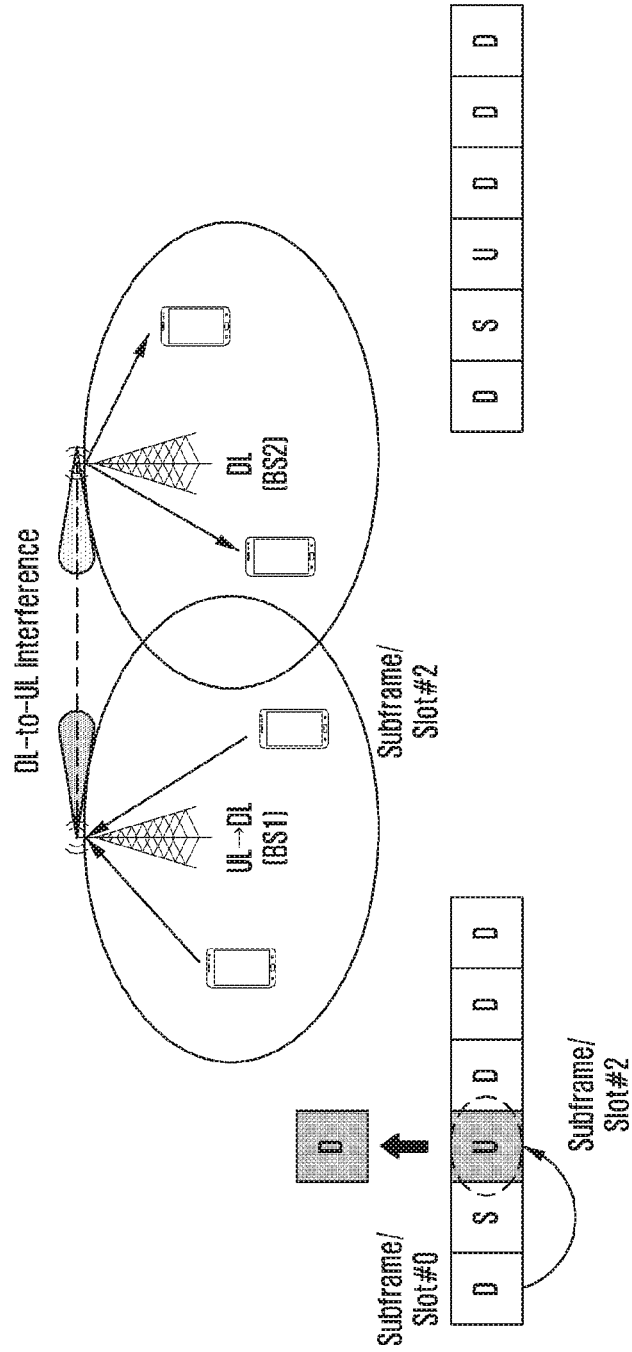
FIG. 13 illustrates a method for transmitting U/D configuration information to an adjacent base station according to the first embodiment of the present disclosure.

FIG. 13 illustrates a method and a procedure for transmitting U/D configuration information to an adjacent base station according to the first embodiment of the present disclosure. In the method illustrated in FIG. 13, a beamforming system is assumed. As described above, it is possible to transmit UL/DL configuration information using an air-interface in order to rapidly transmit the UL/DL configuration information changed on a subframe basis for supporting a low latency service, and it is more general that a beamforming system DCI is transmitted UE-specifically, rather than transmitted commonly. That is, transmission is made by using a beam directing a specific active UE. This is because if all beams are used, increase in overhead may become severe. An adjacent base station may also overhear the corresponding information according to a used beam.

Accordingly, it is required to design a new channel for transmitting UL/D1 configuration information to an adjacent base station in consideration of UE-specific DCI characteristics. Basically, it is assumed that an interference table is shared for each beam pair between base stations. In the following embodiment, a base station that selects U/D configuration on a frame basis and changes a specific subframe based thereon allocates its resource and indicates to an adjacent base station, and the indicated base station is selected based on the shared interference table. Each base station has a unique x-RNTI value like a terminal.

A method in which a BS 1 (interfering base station) transmits UL/DL configuration information to a BS2 (interfered base station) may be largely divided into two cases.

Alt. 1: In a case in which BS 1 allocates a specific channel for BS2 (adjacent base station).

Allocating an xPDCCH in a beam direction for an adjacent base station BS2

Regarding the adjacent base station as one UE.

Beam allocation considering self-interference cancellation capability.

Alt. 2: Not allocating a beam/channel for an adjacent base station (BS2)

Overhearing, by the adjacent base station BS2, an UE (in cell, BS1)-specific xPDCCH.

Indicating a beam that is the same as a beam used in an (n−k)-th subframe to UEs using the corresponding resource, when a transmission direction is changed from UL to DL in a subframe n.

It is required to share active UE/connected UE information of the adjacent base station BS 1 in advance.

Alt. 3: beam/channel unassignment for adjacent base station (BS2) II.

The adjacent base station (BS2) overhearing the intra-cell (BS1) group common/cell-specific xPDCCH.

As a method for receiving, by the BS2, UL/DL configuration information from the BS 1, largely the following three methods may be considered.

Alt. 1: Receiving UL/DL configuration information from all adjacent base stations that may interfere or interfered.

Applied when capacity of the beam is sufficient.

Allocating a dedicated beam and frequency resource to each adjacent base station Decoding using a C-RNTI of an interfering UE or an x-RNTI given from an interfering base station.

When receiving UL/DL configuration information transmitted to a specific UE of an adjacent base station, it is possible to calculate interference using information of a transmission beam index used for supporting the specific UE.

Alt. 2: Receiving UL/DL configuration information from an adjacent base station that may largely interfere or interfered.

In a case in which the number of beams that may be used for receiving U/D configuration information from an adjacent base station is limited.

Allocating a dedicated beam and frequency resource a base station with large interference influence.

Decoding using a C-RNTI of an interfering UE or an x-RNTI given from an interfering base station.

When receiving UL/DL configuration information transmitted to a specific UE of an adjacent base station, it is possible to calculate interference using information of a transmission beam index used for supporting the specific UE.

Alt. 3: Receiving UL/DL configuration information from an adjacent base station using an omni directional antenna.

Decoding using a C-RNTI of an interfering UE or an x-RNTI given from an interfering base station.

When receiving UL/DL configuration information transmitted to a specific UE of an adjacent base station, it is possible to calculate interference using information of a transmission beam index used for supporting the specific UE.

Here, the xPDCCH means a PDCCH or an ePDCCH.

Figure 14A:
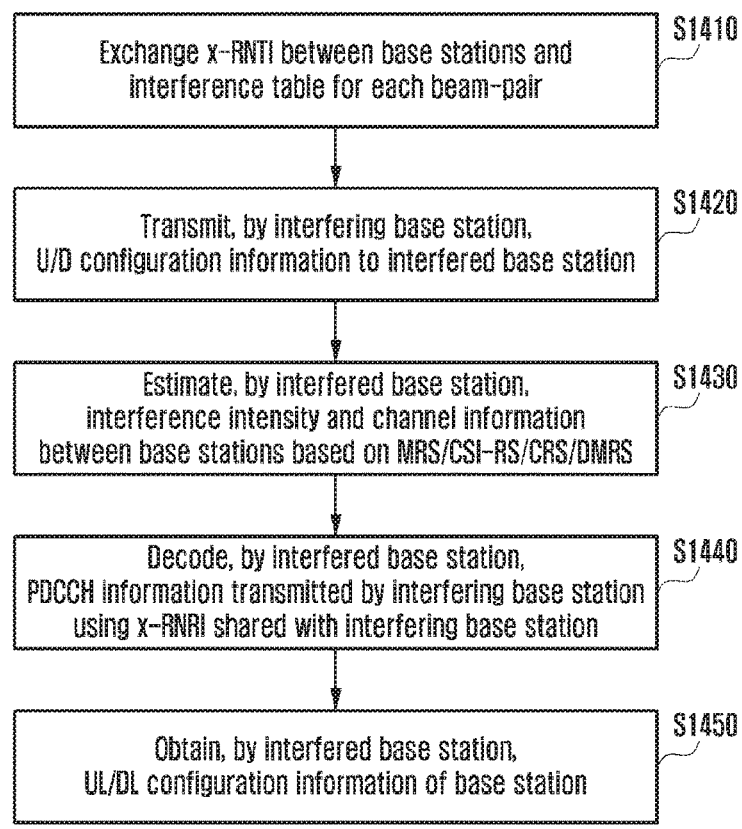
FIGS. 14A and 14B illustrate an example of a procedure for estimating interference intensity and obtaining UL/DL configuration information according to the first embodiment of the present disclosure.
Figure 14B:
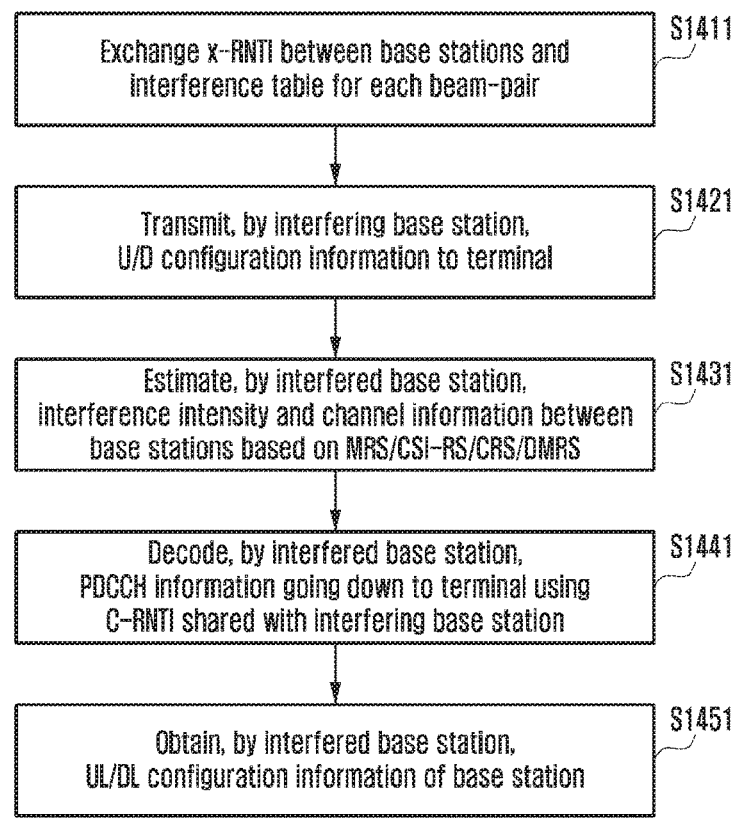

FIGS. 14A and 14B illustrate an example of a procedure for estimating interference intensity and obtaining UL/DL configuration information according to the first embodiment of the present disclosure.

FIG. 14A shows an embodiment of a procedure for obtaining UL/DL configuration information for a case in which an interfering base station transmits UL/DL configuration information to an interfered base station through a dedicated data channel or control channel.

Referring to FIG. 14A, first, an interference table for each x-RNTI and beam pair is exchanged between base stations (S1410), and UL/DL configuration information is transmitted from the interfering base station to the interfered base station (S1420). Then, the interfered base station estimates interference intensity and channel information between base stations using at least one of MRS/CSI-RS/CRS/DMRS (S1430), decodes the estimated channel information and PDCCH information transmitted by the interfering base station using the shared x-RNTI (S1440), and obtains UL/DL configuration information (S1450).

FIG. 14B shows an embodiment of a procedure for obtaining UL/DL configuration information by overhearing, by an interfered base station, UL/DL configuration information transmitted from an interfering base station to a terminal. First, an interference table for each active/connected UE C-RNTI and beam pair is exchanged between base stations (S1411), and UL/DL configuration information is transmitted from the interfering base station to the terminal (S1421). Then, the interfered base station estimates interference intensity and channel information between base stations using at least one of TRS/MRS/CSI-RS/CRS/DMRS (S1431), decodes the estimated channel information and UE-specific PDCCH information transmitted by the interfering base station to the terminal using the shared x-RNTI (S1441), and obtains UL/DL configuration information (S1451).

Figure 15:
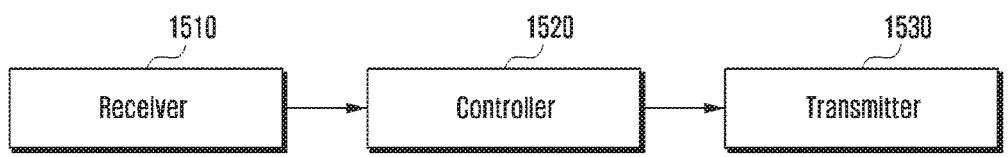
FIG. 15 illustrates a base station apparatus according to the first embodiment of the present disclosure.

FIG. 15 illustrates a base station apparatus (or BS node) according to the first embodiment of the present disclosure.

The base station apparatus according to the first embodiment of the present disclosure may perform rapid UL/DL configuration information exchange in order to solve a problem of DL-to-UL interference occurring due to application of the dynamic TDD.

Referring to FIG. 15, the base station apparatus may include a receiver 1510, a determining unit 1520, and a transmitter 1530. At this time, the receiver 1510 and the transmitter 1530 may be configured as one transceiver, and the determining unit 1520 may also be referred to as a controller (or processor). At this time, the determining unit 1520 may control operations of the receiver 1510 and the transmitter 1530 according to the embodiments of the present disclosure. The base station apparatus according to the embodiment may further include a storage unit for storing information according to the embodiments of the present disclosure.

The receiver 1510 may receive UL/DL configuration information of a specific TTI/subframe/slot transmitted through an UL/DL configuration resource, x-RNTI information allocated by an adjacent base station to a corresponding base station, or information of an RNTI allocated to a specific UE. Further, the receiver 1510 may estimate interference intensity based on an RS transmitted from the base station, and obtain UL/DL configuration information by decoding an UL/DL configuration information channel. In addition, the receiver 1n10 may also obtain UL/DL configuration information of an adjacent base station by decoding a channel through which UL/DL configuration information transmitted to an adjacent terminal is transmitted.

The determining unit 1520 may determine an UL/DL configuration information transmission resource. Further, the determining unit 1520 may determine UL/DL configuration of a specific TTI/subframe/slot. The determining unit 1n20 may also determine whether UL/DL conflict with an adjacent base station occurs at the specific TTI/subframe/slot, and determine influence of interference with the adjacent base station, and the like.

The transmitter 1530 may transmit UL/DL configuration information to an adjacent base station using a wired/wireless resource before exchanging the UL/DL configuration information. The transmitter 1530 may transmit the UL/DL configuration information determined in the determining unit 1520 to the adjacent base station.

Second Embodiment

Since commercialization of the 4G communication system, there has been an effort to develop an improved 5G communication system.

A main feature of the 5G communication system is to support various service scenarios having different requirements as compared to the 4G communication system. Here, the requirement may mean latency, a data rate, a battery life, the number of users simultaneously accessing, coverage, and the like.

For example, an enhanced mobile broad band (eMBB) service aims to implement a data rate higher 100 times or more as compared to the 4G communication system, and is a service for supporting data traffic of users that rapidly increases.

As another example, an ultra reliable and low latency service (URLL) aims to provide very high data transmission/reception reliability and very low latency as compared to the 4G communication system, and may be usefully used in autonomous vehicles, e-health, drones, and the like.

As another example, a massive machine-type-communication (mMTC) service aims to support communications between the larger number of devices per area as compared to the 4G communication system, and is an evolved service of the 4G MTC such as smart metering.

The present disclosure relates to a method and an apparatus for supporting a low latency service using a dynamic TDD system in an environment in which various services capable of supporting such a 5G communication system coexist.

Figure 16:
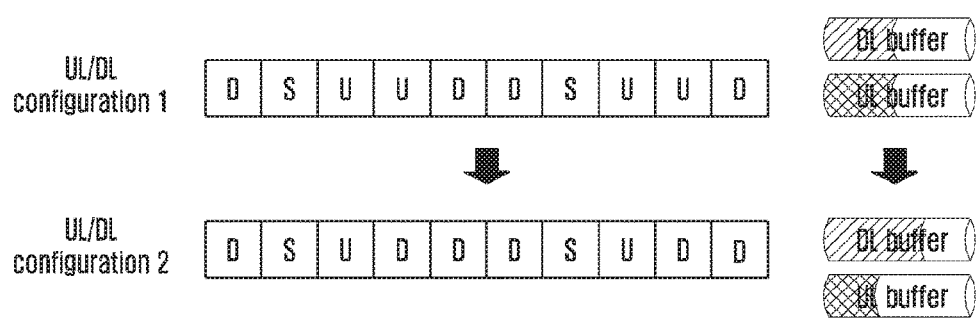
FIG. 16 illustrates an example of a flexible TDD operation.

FIG. 16 shows a concept of flexible TDD. The flexible TDD is a method of efficiently utilizing a resource through dynamic allocation of uplink/downlink TDD resources, in which each base station may use different frame structures by reflecting uplink/downlink traffic.

If proportions of UL traffic and DL traffic buffered at a specific time are similar to each other, as illustrated in FIG. 16, UL/DL configuration 1 may be applied, and if the DL traffic is increased, UL/DL configuration 2 in which DL more than UL may be transmitted in one frame may be applied. Through this, UL/DL traffic arriving asymmetrically may be efficiently transmitted.

Figure 17:
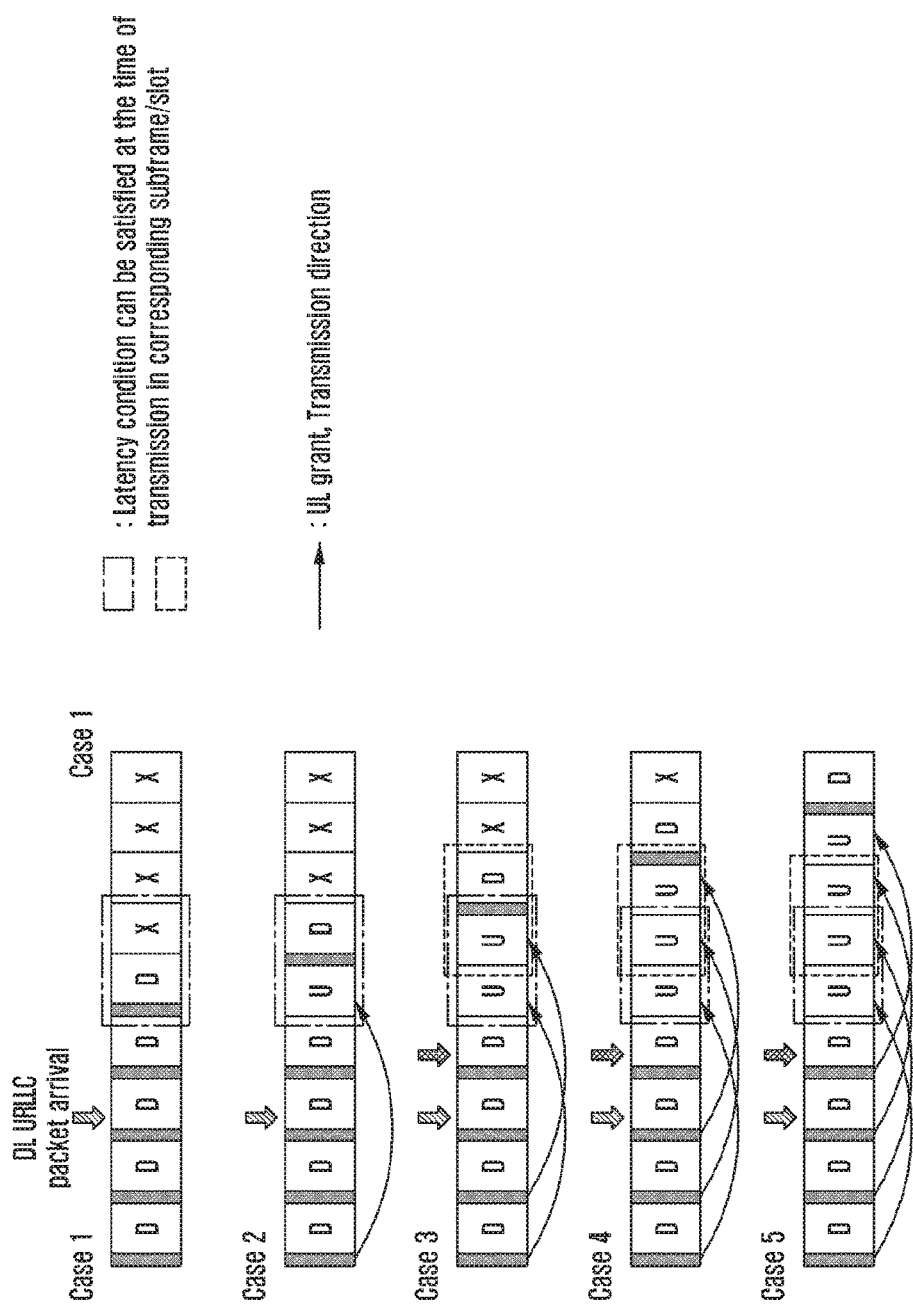
FIG. 17 illustrates an example of a dynamic TDD operation according to a second embodiment of the present disclosure.

FIG. 17 illustrates various uplink/downlink configurations that may appear when the dynamic TDD is applied. In FIG. 17, a subframe/slot marked by a dotted box indicates a subframe/slot to which an URLLC packet arriving at an arrow needs to be transmitted in order to satisfy a latency condition.

As illustrated in FIG. 17, UL grant transmitted in a current (n) subframe/slot is resource allocation information for an (n+k)-th subframe/slot. Here, k may be an integer greater than 1. In the current LTE system, k is set to a value greater than 4 in consideration of a reception processing time, and the like. By doing so, a future use of a subframe/slot is determined in advance.

In the situation in which the future use of the subframe/slot is determined in advance, if a DL URLLC packet requiring low latency arrives, in the case in which the low latency condition for the DL URLLC packet is satisfied as in Cases 1 and 2, the DL URLLC packet may be transmitted within a desired time. However, in the case in which the low latency condition for the DL URLLC packet is not satisfied as in Cases 3, 4 and 5, a situation in which the corresponding packet may not be transmitted within a desired time as illustrated in FIG. 17 may occur.

Therefore, a method for solving a problem that low latency is not satisfied due to pre-allocated subframe/slot is required. That is, in FIG. 17, Cases 1 and 2 both show examples in which a latency condition is satisfied, and Cases 3 to 5 show a situation in which the latency condition for at least one URLLC packet may not be satisfied.

Figure 18:
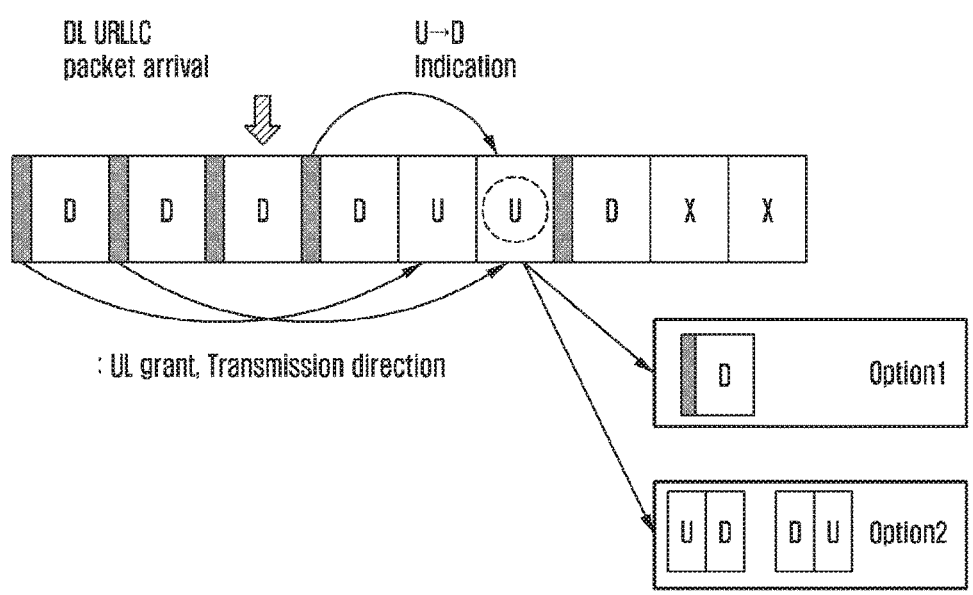
FIG. 18 illustrates an example of a method for solving a problem occurring due to a pre-allocated subframe/slot type according to the second embodiment of the present disclosure.

FIG. 18 illustrates a method for solving a problem of not satisfying a low latency requirement occurring in a situation in which uplink/downlink configuration as in Case 3 illustrated in FIG. 17 is formed.

Referring to FIG. 18, if a packet requiring low latency like URLLC needs to be transmitted at an (n)-th subframe/slot allocated to UL in an (n−4)-th subframe/slot, the corresponding subframe/slot is changed into a downlink or mixed subframe/slot through a downlink control channel of the earliest subframe/slot (this is referred to as a low latency mode).

A first option in which an UL subframe/slot is changed into a DL subframe/slot may be applied to a case in which there is no Ack/Nack information to be transmitted, a case in which it is not an UL URLLC resource, a case in which there is Ack/Nack information to be transmitted, but it is not urgent, or the like.

A second option in which an UL subframe/slot is changed into a mixed subframe/slot may be applied to a case in which there is Ack/Nack information to be transmitted, a case in which an UL URLLC resource is allocated, or the like. In the case of the second option, U/D ratio information of the mixed (special) subframe may be transmitted through a DCI as needed.

Further, an indication to make an UE receiving UL grant to ignore previous UL grant is required. If there is no indication, inter-user interference may occur. The indication may be implicitly or explicitly transmitted to a user receiving UL grant.

Signaling of a transmission direction may be an example of transmitting implicitly, and indication of whether previous grant is valid is given using 1 bit may be an example of transmitting explicitly. Further, new UL grant information needs to be transmitted to a corresponding user. If UL grant information for an Ack/Nack resource related to transmission of previously transmitted DL data is transmitted, a resource may be allocated to an (n−k)-th subframe. Here, k may be shorter than a minimum UL grant timing. Changed transmission direction information may need to be transmitted to a user not receiving UL grant in order to allow the user to receive downlink control information.

If more generalizing the low-latency mode described mode, the low-latency mode may be described as below. When a packet requiring a low latency service like URLLC arrives at an n-th subframe/slot, if the same transmission direction is filled at a subframe/slot between (n+1−m+1) and (n+1), the transmission direction is changed at an (n+1−m) subframe/slot using DL. Here, an (n+1)-th subframe/slot is the last subframe/slot in which transmission is to be made to satisfy latency. m subframes/slots are a minimum subframe/slot interval at which change of (U→D)/(D→U) may be made.

Figure 19A:
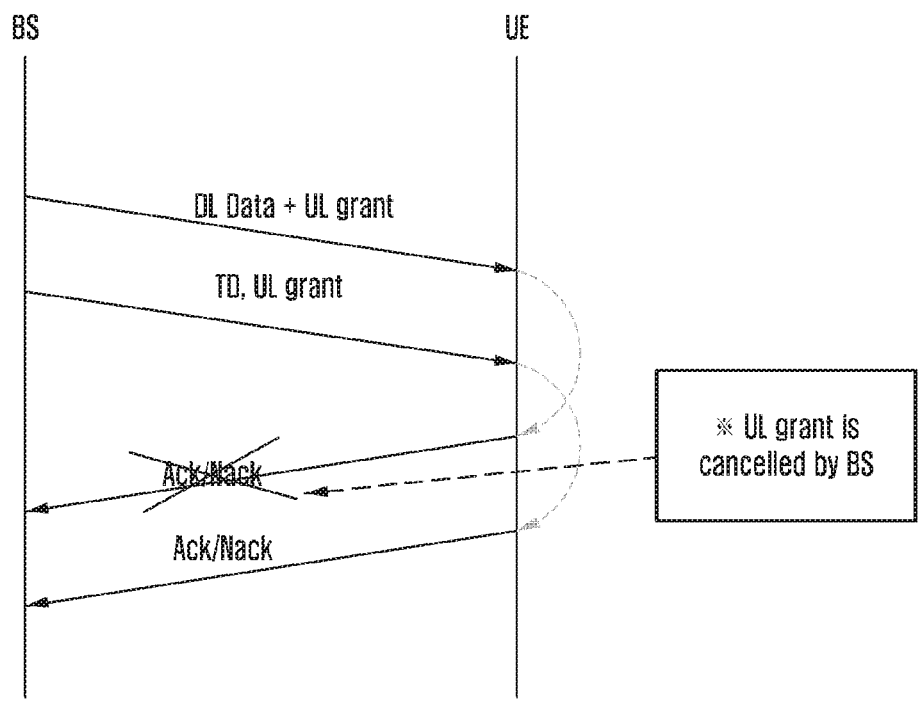
FIGS. 19A and 19B illustrate an example of a method of Ack/Nack management according to a change of a pre-allocated subframe according to the second embodiment of the present disclosure.
Figure 19B:
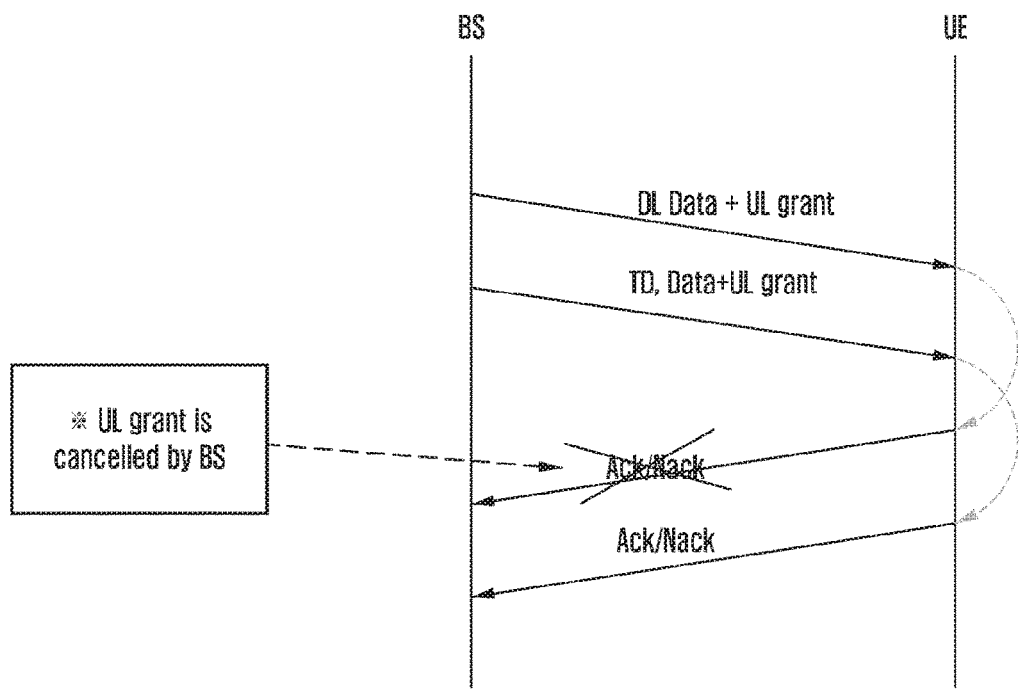

FIGS. 19A and 19B illustrate an example of a method of Ack/Nack management according to a change of a pre-allocated subframe according to a second embodiment of the present disclosure.

Referring to FIG. 19A, in a first alternative, UL grant (Ack/Nack resource, new UL data transmission resource, and the like) is transmitted together with transmission direction (TD) change information to a terminal receiving UL grant in advance. In this case, a transmission direction may be transmitted through an UE-specific search space of a PDCCH, or through a common search space so that all users may receive.

Referring to FIG. 19B, in a second alternative, data and UL grant (Ack/Nack resource, new UL data transmission resource, and the like) are transmitted together with transmission direction (TD) change information to a terminal receiving UL grant in advance. Also in this case, a transmission direction may be transmitted through an UE-specific search space of a PDCCH, or through a common search space so that all users may receive.

Figure 20A:
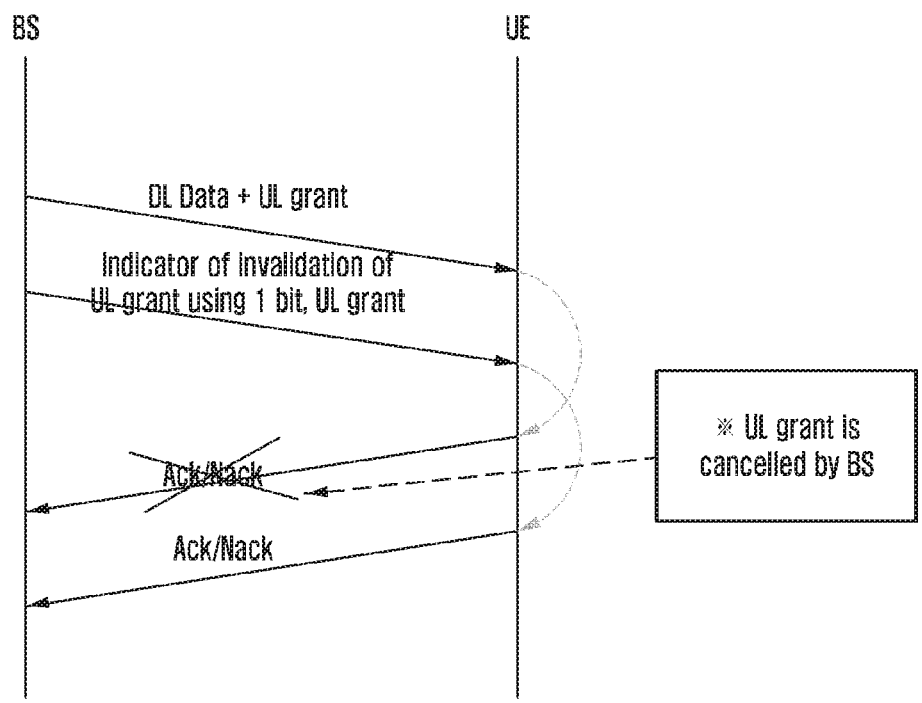
FIGS. 20A and 20B illustrate an example of a method for increasing a reception rate of subframe/slot type change information according to the second embodiment of the present disclosure.
Figure 20B:
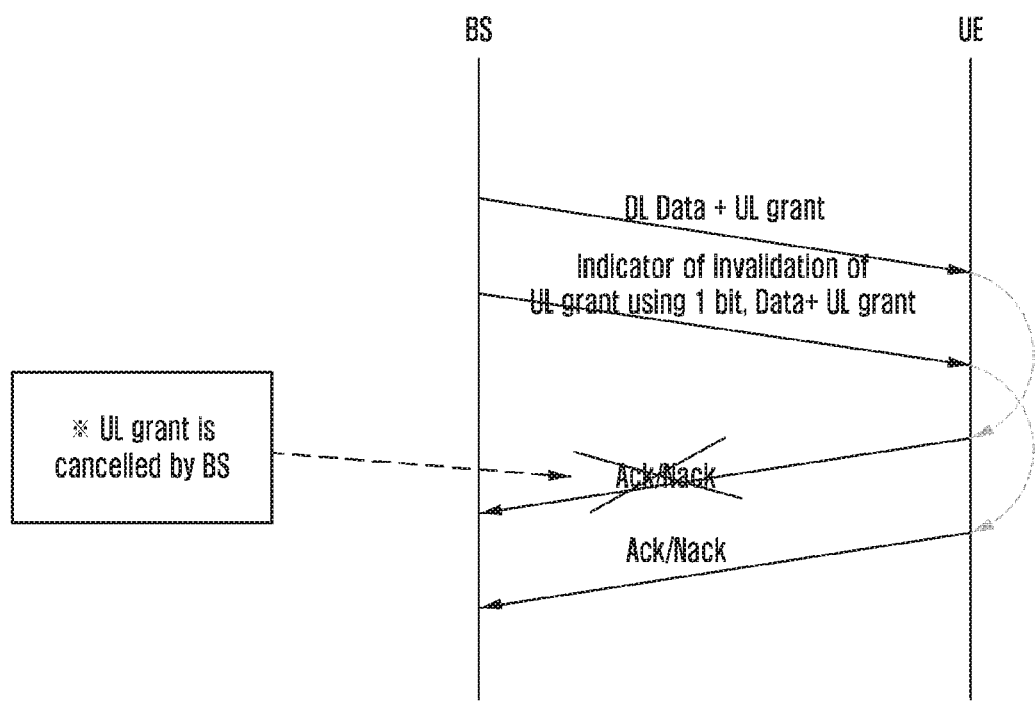

FIGS. 20A and 20B illustrate an example of a method for increasing a reception rate of subframe/slot type change information according to the second embodiment of the present disclosure. That is, FIGS. 20A and 20B show an embodiment of a method for solving a problem that a user receiving UL grant fails to decode a PDCCH transmitted after an URLLC packet arrives.

In order to solve the problem, transmission direction change information is transmitted through a common search space of a PDCCH, transmission direction information is transmitted through an UE-specific search space of a PDCCH, or indication of indicating whether previous grant is valid using 1 bit is transmitted. That is, the transmission direction change information transmitted through the common search space of the PDCCH is for all UEs regardless of whether UL grant is received at a previous subframe/slot.

Figure 21A:
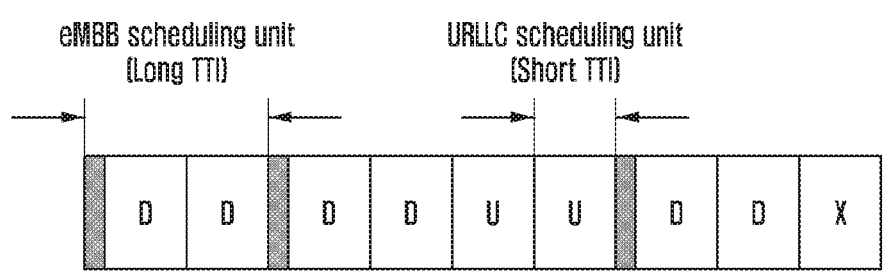
FIGS. 21A and 21B illustrate an example of a method for solving a problem occurring due to a pre-allocated subframe/slot type in a system in which different types of services are operated at different TTIs according to the second embodiment of the present disclosure.
Figure 21B:
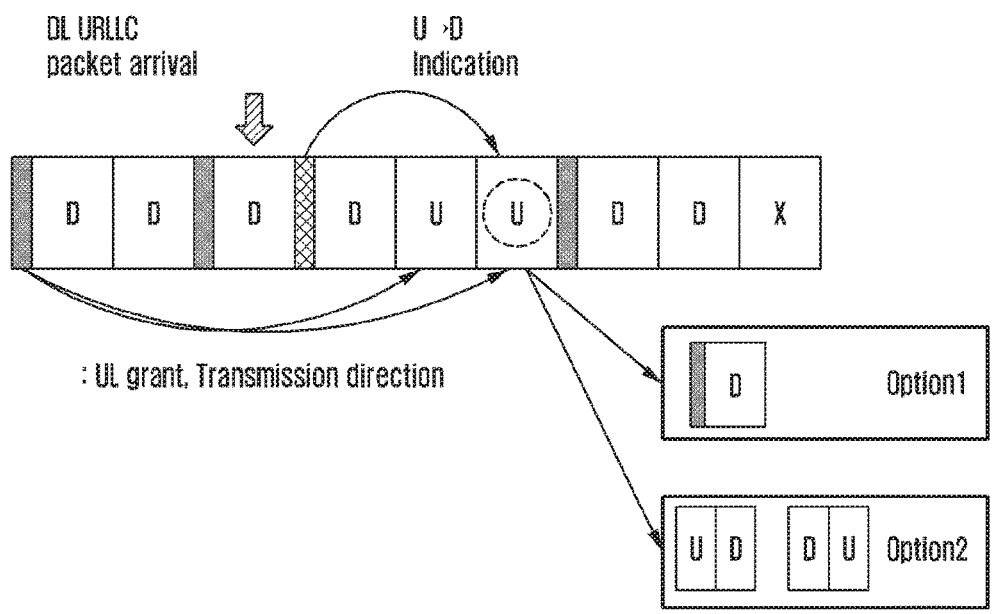

FIGS. 21A and 21B illustrate an example of a method for solving a problem occurring due to a pre-allocated subframe/slot type in a system in which different types of services are operated at different TTIs according to the second embodiment of the present disclosure. That is, FIGS. 21A and 21B show an embodiment of a method for solving a problem of not satisfying a low latency requirement occurring in a case in which uplink/downlink configuration as in Case 3 described above is formed in a situation in which different types of services are operated at different TTIs.

Referring to FIG. 21A, an eMBB may be scheduled according to a long TTI, and URLLC may be operated according to a short TTI. At this time, as illustrated in FIG. 21B, if a packet requiring low latency like URLLC arrives after an (n−4)-th subframe/slot in a situation in which the (n)-th subframe/slot is allocated to UL at the preceding (n−4)-th subframe/slot on a short TTI basis, the corresponding subframe is changed into a downlink or mixed subframe/slot through a downlink control channel of the earliest subframe/slot.

As a method therefor, a method in which a DL control channel is added when an URLLC packet arrives may be considered. A main purpose of the added DL control channel is to secure a subframe/slot in which URLLC data is to be transmitted, that is, to change a transmission direction of a specific subframe/slot. Further, the added DL control channel may also be used in order to transmit a transmission direction or UL grant information of other subframe/slot.

A first option in which an UL subframe/slot is changed into a DL subframe/slot may be applied to a case in which there is no Ack/Nack information to be transmitted, a case in which it is not an UL URLLC resource, a case in which there is Ack/Nack information to be transmitted, but it is not urgent, or the like.

A second option in which an UL subframe/slot is changed into a mixed subframe/slot may be applied to a case in which there is Ack/Nack information to be transmitted, a case in which an UL URLLC resource is allocated, or the like. In the case of the second option, U/D ratio information of the mixed (special) subframe may be transmitted through a DCI as needed. An indication to make an UE receiving UL grant to ignore previous UL grant is required. If there is no indication, inter-user interference may occur. The indication may be implicitly or explicitly transmitted to a user receiving UL grant.

Signaling of a transmission direction (TD) may be an example of transmitting implicitly, and indication of whether previous grant is valid is given using 1 bit may be an example of transmitting explicitly. Further, new UL grant information needs to be transmitted to a corresponding user. If UL grant information for an Ack/Nack resource related to transmission of previously transmitted DL data is transmitted, a resource may be allocated to an (n−k)-th subframe/slot. Here, k may be shorter than a minimum UL grant timing. Changed transmission direction information may need to be transmitted to a user not receiving UL grant in order to allow the user to receive downlink control information. A resource through which such information is transmitted may be allocated to an OFDM symbol in which the eMBB terminal operated according to a long TTI as in FIG. 21A does not perform PDCCH decoding. In this case, a method for receiving, by the eMBB terminal operated according to a long TTI, DL control information added on a short TTI basis. As the method, various alternatives as below exist.

Alt. 1: A terminal operated according to a long TTI also always reads a PDCCH on a short TTI basis.

Alt. 2: All UEs read a preceding PDCCH on a short TTI basis at the time of allocating/forming configuration that does not satisfy a low latency condition.

Alt. 3: UEs receiving UL grant read a preceding PDCCH on a short TTI basis at the time of allocating/forming configuration that does not satisfy a low latency condition.

Alt. 4: UEs receiving DL/UL grant read a preceding PDCCH on a short TTI basis at the time of allocating/forming configuration that does not satisfy a low latency condition.

The case of reading a PDDCH on a short TTI basis always/according to a condition may be divided into two cases. A first case is a method of searching all search spaces, and a second case is a method of searching only a common search space. The later case has an advantage of decreasing blind detection, while the former has an advantage of increasing scheduling flexibility.

Figure 22A:
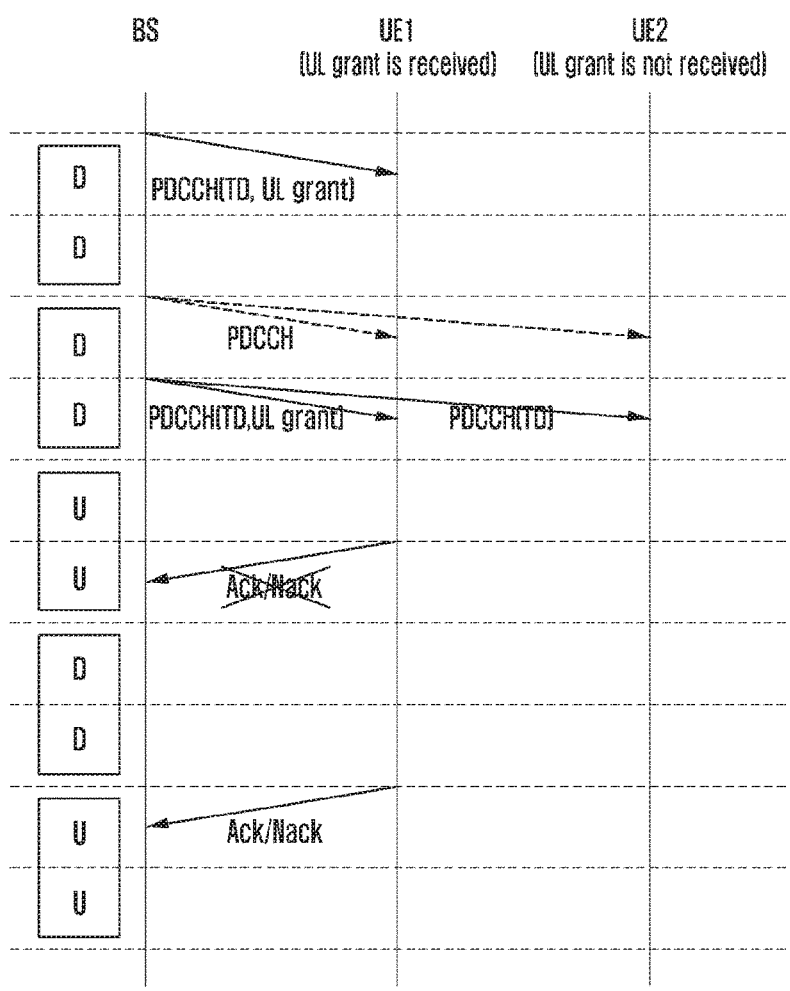
FIGS. 22A and 22B illustrate an example of a method for solving a problem of not satisfying a low latency condition for a case in which different types of services are operated at different TTIs according to the second embodiment of the present disclosure.
Figure 22B:
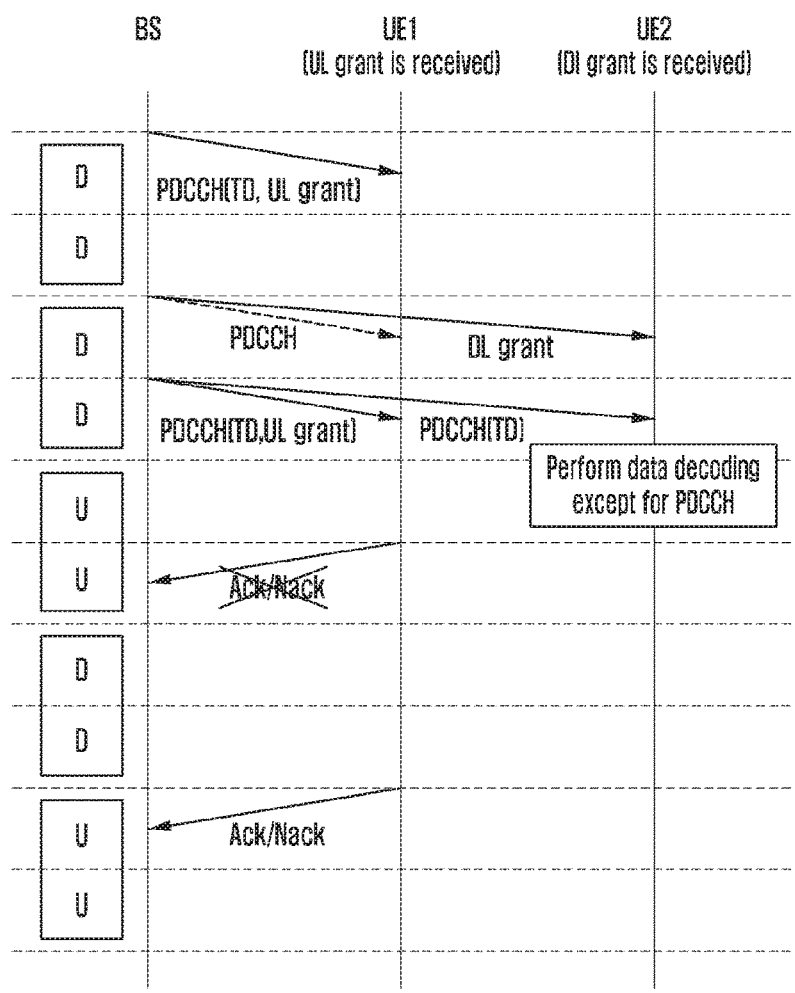

FIGS. 22A and 22B illustrate an example of a method for solving a problem of not satisfying a low latency condition for a case in which different kinds of services are operated at different TTIs according to the second embodiment of the present disclosure.

In FIG. 22A, UE1 is an UE receiving UL grant by a BS, and UE2 is an UE not receiving UL grant. However, the UE2 may be an UE receiving DL grant for eMBB as in FIG. 22B.

First, as illustrated in FIG. 22A, if the UE2 does not receive both UL/DL grant, the UE2 may also receive new scheduling information together with transmission direction change information through a PDCCH transmitted on a short TTI basis.

Further, as illustrated in FIG. 22B, if the UE2 receives DL grant, some of resources through which its data is to be transmitted may be replaced with a PDCCH resource, thus the UE2 performs decoding of the PDCCH transmitted on a short TTI basis, and decodes its data based on the information. That is, decoding is performed on received data except for a reception signal of the resource through which the PDCCH is transmitted.

Figure 23:
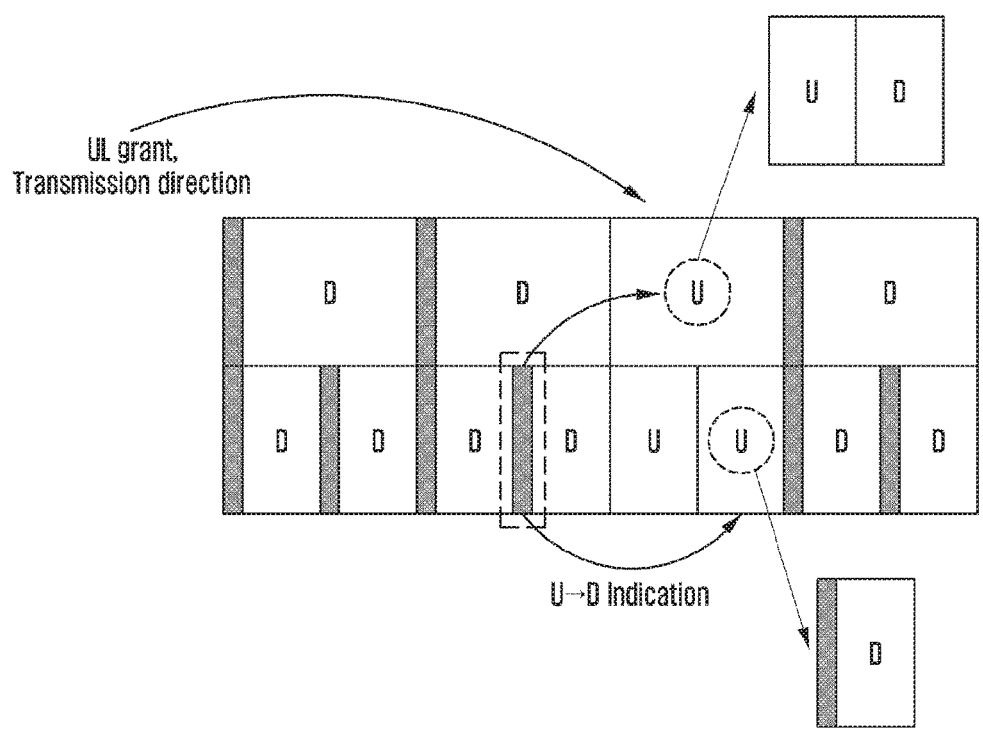
FIG. 23 illustrates an example of a method for solving a problem of not satisfying a low latency condition due to a pre-allocated subframe/slot in a system of supporting multi-numerology by an FDM method according to the second embodiment of the present disclosure.

FIG. 23 illustrates an example of a method for solving a problem of not satisfying a low latency condition due to a pre-allocated subframe/slot in a system of supporting multi-numerology by an FDM method according to the second embodiment of the present disclosure.

Referring to FIG. 23, an eMBB may be scheduled according to a long TTI, and URLLC may be operated according to a short TTI corresponds thereto. As illustrated in FIG. 23, if a packet requiring low latency like URLLC arrives in a situation in which a third subframe/slot on a long TTI basis is allocated to UL in advance, the corresponding subframe/slot is changed into downlink through a downlink control channel of the earliest subframe/slot.

To this end, a DL control channel of a DL subframe/slot operated on a short TTI basis may be used when a URLLC packet arrives. A main purpose of the DL control channel is to secure a subframe in which URLLC data is to be transmitted, that is, to change a transmission direction of a specific subframe. Further, the added DL control channel may also be used in order to transmit a transmission direction or UL grant information of other subframe. In corresponding scenario, a method for receiving, by the eMBB terminal operated according to a long TTI, DL control information added on a short TTI basis. As the method, various alternatives as below exist.

Alt. 1: A terminal operated according to a long TTI also reads a PDCCH on a short TTI basis.

Alt. 2: All UEs read a preceding PDCCH in a frequency domain on a short TTI basis at the time of allocating/forming configuration that does not satisfy a low latency condition.

Alt. 3: UEs receiving UL grant read a preceding PDCCH in a frequency domain on a short TTI basis at the time of allocating/forming configuration that does not satisfy a low latency condition.

Alt. 4: UEs receiving DL/UL grant read a preceding PDCCH in a frequency domain on a short TTI basis at the time of allocating/forming configuration that does not satisfy a low latency condition.

The case of reading a PDDCH on a short TTI basis always/according to a condition may be divided into two cases. A first case is a method of searching all search spaces, and a second case is a method of searching only a common search space. The later case has an advantage of decreasing blind detection, while the former has an advantage of increasing scheduling flexibility.

When changing some subframes/slots on a short TTI basis from uplink to downlink using a DL control channel of a DL subframe/slot operated on a short TTI basis, a transmission direction for a subframe/slot on a long TTI basis of transmission performed at the same time needs to be changed. In the embodiment, a case in which an uplink subframe/slot is changed into a mixed subframe/slot is shown. If not changing the subframe/slot on a long TTI basis, interference between UL and DL may occur.

By performing transmission in a form of symbol-by-symbol, transmission processing needs not be performed again even when a subframe/slot type is changed, thus transmission in a desired time is possible. The transmission in a form of symbol-to-symbol means that one code block or transport block is allocated for each OFDM symbol, such that the corresponding block or transport block may be decoded even when only OFDM symbol is received.

Figure 24:
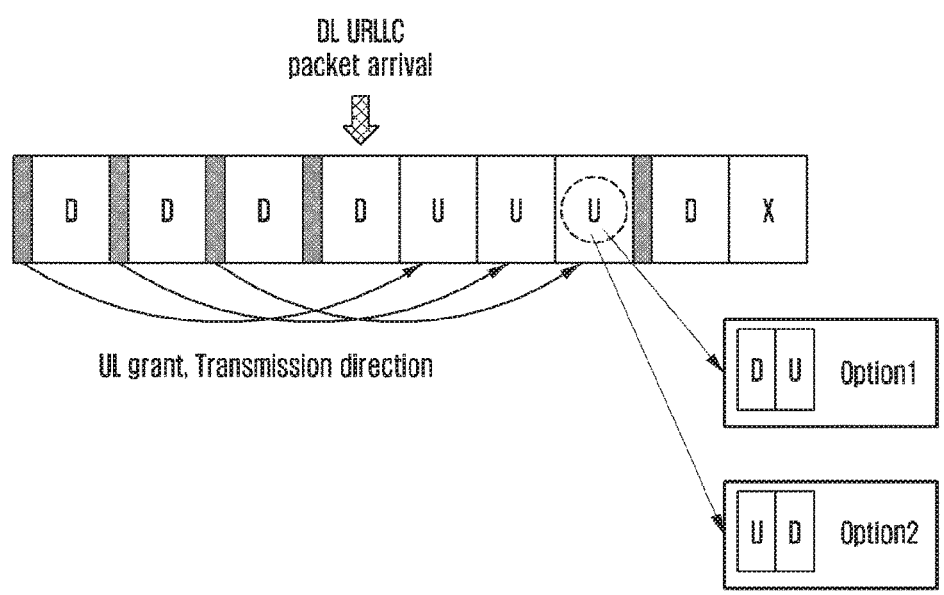
FIG. 24 illustrates an example of a subframe/slot management method for satisfying a low latency condition according to the second embodiment of the present disclosure.

FIG. 24 illustrates an example of a subframe/slot management method for satisfying a low latency condition according to an embodiment of the present disclosure. In a case of Cases 4 and 5 in FIG. 17, subframes/slots in which a DL URLLC packet is to be transmitted to satisfy the lower latency condition after the DL URLLC packet arrives are configured as UL, it is not possible to change a specific subframe/slot in which the URLLC packet may be transmitted within a desired time. That is, there is not method of changing a UL subframe/slot into a DL subframe/slot and indicating the change due to continuous allocation of UL subframe/slot. To solve the problem, if continuous allocation of UL subframe/slot in consideration of a length of a subframe/slot and a low latency condition is required, the last UL subframe/slot is allocated as a mixed subframe (specific subframe).

In the embodiment, if three UL subframes/slots are continuously allocated, the third subframe/slot is allocated as a mixed subframe/slot. There are two options when allocating as a mixed subframe/slot instead of a UL subframe/slot. In the embodiment, in a case of allocating UID mixed subframe/slot like option 2, if DL control information is positioned at the center of the subframe/slot and a next subframe/slot is DL, a guard period (GP) is not required. Further, it is possible to prevent latency from being increased by positioning UL URLLC and HARQ ACK/NACK information at a front portion of the subframe/slot. Further, at the time of transmitting UL grant for part of an n-th subframe at an (n−k)-th subframe/slot, information on a transmission direction needs to be transmitted together.

In the embodiment, in a case of allocating DIU mixed subframe/slot like option 1, DL control information may be positioned at the front of the subframe/slot, and a GP is always required. Since UL URLLC and HARQ ACK/NACK information is positioned at a rear portion of the subframe/slot, latency may be relatively increased. Although UL grant for part of an n-th subframe is transmitted at an (n−k)-th subframe/slot, an operation may be made even when information on a transmission direction is not transmitted together.

If more generalizing the subframe/slot direction management method for satisfying the low latency condition described with reference to FIG. 24, the method may be described as below. If a minimum subframe/slot interval that may change a subframe/slot allocated to UL is m, subframes/slots of which the number is greater than m is determined to have the same UL transmission direction, the last subframe is allocated as a mixed subframe or a DL subframe.

Figure 25:
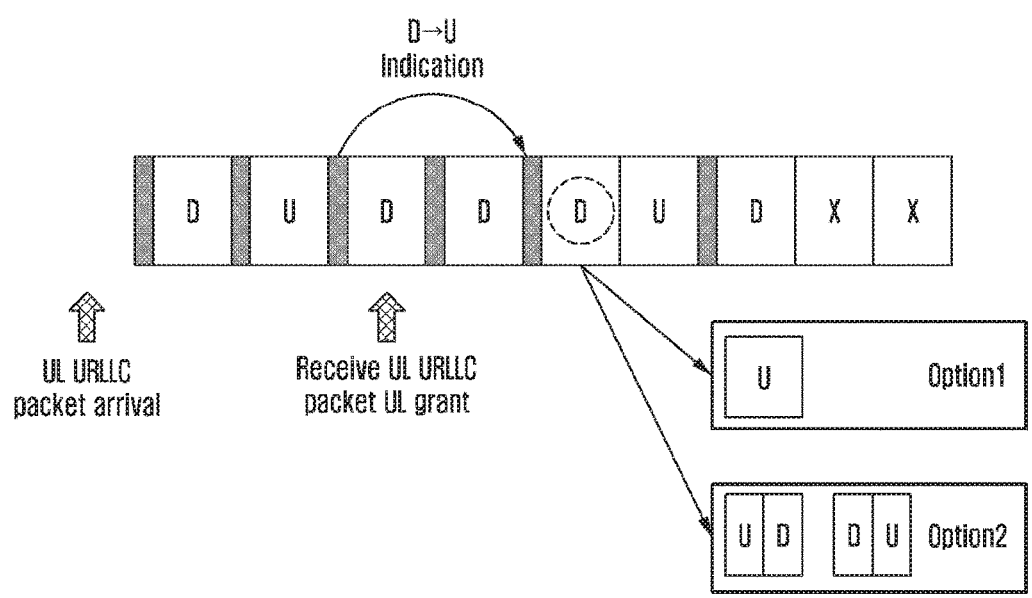
FIG. 25 illustrates an example of a UL URLLC packet transmission method in which a low latency mode is applied according to the second embodiment of the present disclosure.

FIG. 25 illustrates an example of a UL URLLC packet transmission method in which a low latency mode is applied according to the second embodiment of the present disclosure. In the case of UL, a problem that transmission using an allocated resource may be difficult due to processing delay even if UL grant is received and a transmission direction of the subframe/slot is changed from D to U occurs.

To solve this problem, the following method may be used. A transmittable URLLC data size that may be transmitted is tabled (that is, limit a transmittable URLLC data size), and a fixed AMC is applied. By doing so, an amount of resource required for transmission may be fixed or limited. At the time of schedule request (SR), a data size is transmitted together, and URLLC transmission data processing is completed until receiving UL grant to perform URLLC data transmission through a newly allocated UL resource after receiving UL grant.

Figure 26:
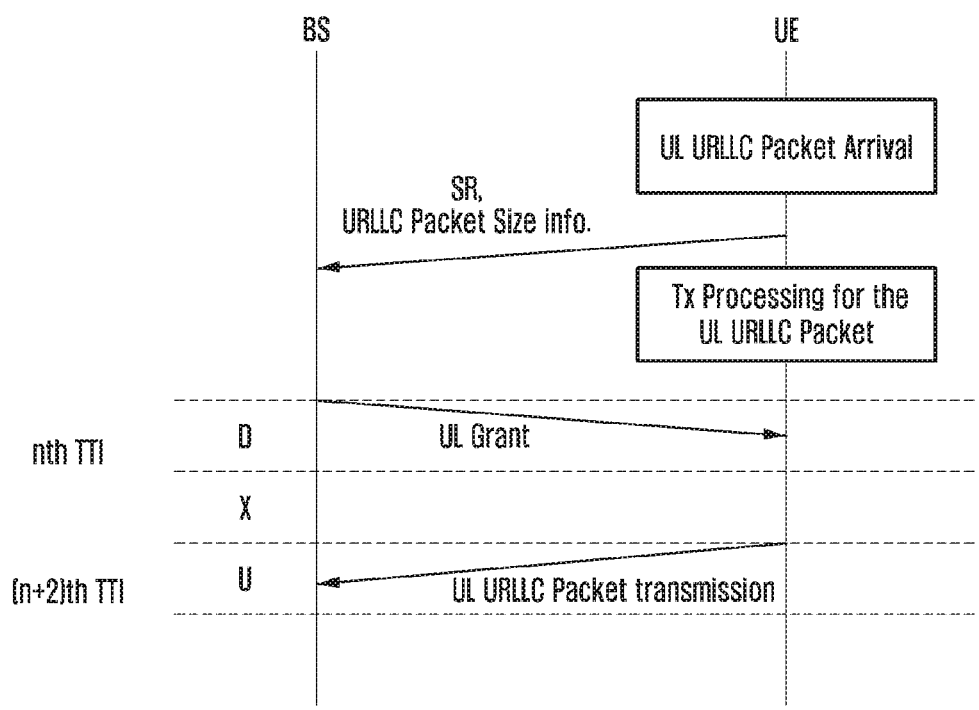
FIG. 26 illustrates a UL URLLC packet transmission method in which a low latency mode is applied according to the second embodiment of the present disclosure.

FIG. 26 illustrates a UL URLLC packet transmission method in which a low latency mode is applied according to the second embodiment of the present disclosure.

Referring to FIG. 26, first, an UE having a UL URLLC packet to be transmitted transmits an SR to a base station. At this time, size information of the URLLC packet size to be transmitted is transmitted together. The URLLC packet size is selected from a URLLC packet size table, and corresponding information bit may be transmitted. The UE performs transmission processing for the UL URLLC packet while waiting UL grant from the BS, and transmits the UL URLLC packet in an (n+2)-th subframe/slot after receiving UL grant from an n-th subframe/slot.

Figure 27:
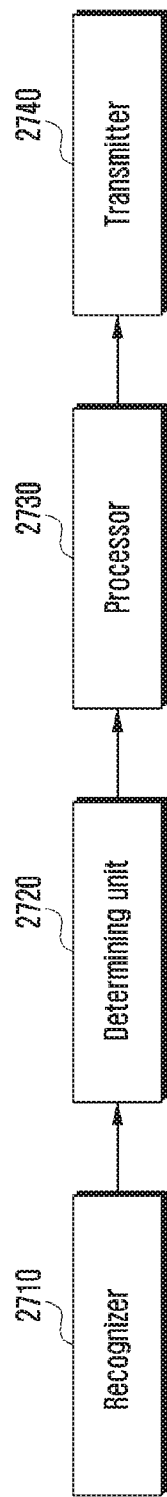
FIG. 27 illustrates a base station apparatus effectively supporting a low latency service in a dynamic TDD system according to the second embodiment of the present disclosure.

FIG. 27 illustrates a base station apparatus (or BS node) supporting a low latency service in a dynamic TDD system according to the second embodiment of the present disclosure.

Referring to FIG. 27, a BS node according to the second embodiment of the present disclosure may include a recognizer 2710, a determining unit 2720, a generator 2730, and a transmitter 2740. Here, at least one of the recognizer 2710, the determining unit 2720, and the generator 2730 may also be implemented as a controller (or processor). FIG. 27 illustrates only the transmitter 2740, but the base station apparatus may include a transceiver including a transmitter and a receiver.

The recognizer 2710 may recognize whether a packet requiring low latency arrives.

The determining unit 2720 may determine whether to change a transmission direction of a pre-allocated subframe/slot by considering a transmission direction of a currently allocated subframe/slot. Further, the determining unit 2720 may also determine a transmission direction of a next subframe/slot by considering a transmission direction of a currently allocated subframe/slot.

The generator 2730 may generate information of change of a subframe/slot form, UL grant information, or the like to be transmitted to an UE if the determining unit 2720 determines that the subframe/slot needs to be changed.

The transmitter 2740 may transmit the information of change of a subframe/slot form, the UL grant information, or the like generated by the generator 2730 to the UE.

Figure 28:
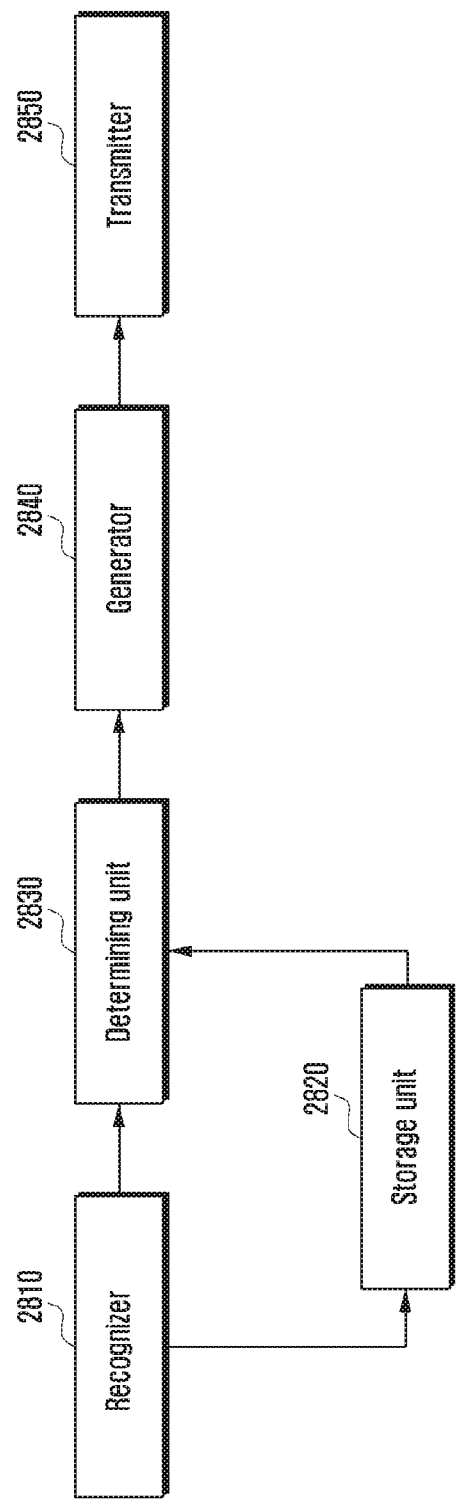
FIG. 28 illustrates a terminal apparatus effectively supporting a low latency service in a dynamic TDD system according to the second embodiment of the present disclosure.

FIG. 28 illustrates a terminal apparatus (or UE node) effectively supporting a low latency service in a dynamic TDD system according to the second embodiment of the present disclosure.

Referring to FIG. 28, a terminal apparatus (or BS node) according to the second embodiment of the present disclosure may include a recognizer 2810, a storage unit 2820, a determining unit 2830, a generator 2840, and a transmitter 2850. Here, at least one of the recognizer 2810, the determining unit 2830, and the generator 2840 may configure a controller (or processor). FIG. 28 illustrates only the transmitter 2850, but the terminal apparatus may include a transceiver including a transmitter and a receiver.

The recognizer 2810 may recognize whether a packet requiring low latency arrives.

The storage unit 2820 may store supportable low latency service (e.g. URLLC) packet size information.

If arrival of the packet requiring low latency is recognized, the determining unit 2830 selects bit information for a low latency packet size to be transmitted together with an SR referring to a transmittable low latency packet table stored in the storage unit 2820. A terminal operated on a long TTI basis may determine whether to decode downlink control information transmitted on a short TTI basis. Further, the determining unit 2830 may determine whether to ignore information of UL grant allocated in a specific subframe/slot by receiving transmission and UL grant information transmitted from the base station.

The generator 2840 performs transmission processing to transmit the information obtained in the determining unit 2830 through a wireless channel. Further, transmission processing for a low latency packet to be transmitted before UL grant is received is performed.

The transmitter 2850 may transmit information on the low latency packet size and the low latency packet processed in the determining unit 2830.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating, by a base station, a resource in a dynamic time division duplex (TDD) system, the method comprising: transmitting, by the base station to a terminal, resource allocation information for an n+k-th transmission time interval (TTI) at an n-th TTI, n being a natural number and k being a natural number; identifying that a packet for a first service is required to be processed at the n+k-th TTI after transmitting the resource allocation information, wherein the first service is for an ultra reliable and low latency communication (URLLC); determining, by the base station, whether to change the resource allocation information based on the identification; generating resource allocation change information indicating to allocate downlink at a whole or part of the n+k-th TTI if the packet is associated with downlink URLLC and uplink is allocated at the n+k-th TTI by the resource allocation information; and transmitting, by the base station to the terminal, resource allocation change information indicating change of the resource allocation information based on the determination to change the resource allocation information to process the first service.

2. The method of claim 1, wherein the TTI is a subframe, slot, or mini-slot.

3. The method of claim 1, further comprising: generating first resource allocation change information indicating to allocate the downlink at a whole of the n+k-th TTI if there is no Ack or Nack information to be transmitted at the n+k-th TTI or uplink URLLC resource is not allocated.

4. The method of claim 1, further comprising: generating second resource allocation change information indicating to allocate the downlink at part of the n+k-th TTI if there is Ack or Nack information to be transmitted at the n+k-th TTI or uplink URLLC resource is allocated.

5. The method of claim 4, further comprising:
transmitting information on a ratio of the uplink and the downlink allocated at the n+k-th TTI associated with the second resource allocation change information to the terminal.

6. The method of claim 1, further comprising:
transmitting an indicator indicating to ignore the resource allocation information to the terminal.

7. The method of claim 1, wherein, if the first service is operated at a first TTI and a second service requiring a high data transmission rate is operated at a second TTI, the terminal performing the second service receives downlink control information of the first TTI.

8. The method of claim 1, further comprising:
receiving information on an uplink URLLC packet size together with a scheduling request (SR) from the terminal.

9. A method for receiving, by a terminal, resource allocation in a dynamic time division duplex (TDD) system, the method comprising: receiving, by the terminal from a base station, resource allocation information for an n+k-th transmission time interval (TTI) at an n-th TTI, n being a natural number and k being a natural number; identifying that a packet for a first service is required to be processed at the n+k-th TTI after transmitting the resource allocation information, wherein the first service is for an ultra reliable and low latency communication (URLLC); and receiving, by the terminal from the base station, resource allocation change information indicating change of the resource allocation information based on the identification, wherein the resource allocation change information indicates to allocate downlink at a whole or part of the n+k-th TTI if the packet is associated with downlink URLLC and uplink is allocated at the n+k-th TTI by the resource allocation information.

10. The method of claim 9, wherein the TTI is a subframe, slot, or mini-slot.

11. The method of claim 9, further comprising: receiving information on a ratio of the uplink and the downlink allocated at the n+k-th TTI from the base station if the resource allocation change information indicates to allocate the downlink at part of the n+k-th TTI.

12. The method of claim 9, further comprising:
receiving an indicator indicating to ignore the resource allocation information from the base station.

13. The method of claim 9, further comprising:
receiving, by the terminal configured to perform a second service, downlink control information of a first TTI, if the first service is operated at a first TTI, and the second service requiring a high data transmission rate is operated at a second TTI.

14. The method of claim 9, further comprising:
transmitting information on an uplink URLLC packet size together with an SR to the base station.

15. A base station allocating a resource in a dynamic TDD system, the base station comprising: a transceiver; and a controller coupled with the transceiver and configured to control to: transmit, to a terminal, resource allocation information for an n+k-th TTI at an n-th TTI, n being a natural number and k being a natural number, identify that a packet for a first service is required to be processed at the n+k-th TTI after transmitting the resource allocation information, wherein the first service is for an ultra reliable and low latency communication (URLLC), determine whether to change the resource allocation information based on the identification, and transmit, to the terminal, resource allocation change information indicating change of the resource allocation information based on the determination to change the resource allocation information to process the first service, wherein the controller is configured to generate resource allocation change information indicating to allocate downlink at a whole or part of the n+k-th TTI if a packet is associated with downlink URLLC and uplink is allocated at the n+k-th TTI by the resource allocation information.

16. A terminal receiving resource allocation in a dynamic TDD system, the terminal comprising: a transceiver; and a controller coupled with the transceiver and configured to control to: receive, from a base station, resource allocation information for an n+k-th TTI at an n-th TTI, n being a natural number and k being a natural number, identify that a packet for a first service is required to be processed at the n+k-th TTI after transmitting the resource allocation information, wherein the first service is for an ultra reliable and low latency communication (URLLC), and receive, from the base station, resource allocation change information indicating change of the resource allocation information based on the identification, wherein the resource allocation change information indicates to allocate downlink at a whole or part of the n+k-th TTI if the packet is associated with downlink URLLC and uplink is allocated at the n+k-th TTI by the resource allocation information.

* * * * *